US009706357B2

(12) United States Patent
Heo et al.

(10) Patent No.: US 9,706,357 B2
(45) Date of Patent: Jul. 11, 2017

(54) METHOD AND APPARATUS FOR PROVIDING LOCATION INFORMATION

(71) Applicant: Samsung Electronics Co., Ltd., Gyeonggi-do (KR)

(72) Inventors: Changryong Heo, Gyeonggi-do (KR); Chihyun Cho, Gyeonggi-do (KR); Ohyong Kwon, Gyeonggi-do (KR); Kihuk Lee, Gyeonggi-do (KR); Kunwoo Baek, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/726,830

(22) Filed: Jun. 1, 2015

(65) Prior Publication Data
US 2015/0358778 A1 Dec. 10, 2015

(30) Foreign Application Priority Data
Jun. 5, 2014 (KR) ........................ 10-2014-0068159

(51) Int. Cl.
*G06Q 20/40* (2012.01)
*H04W 24/08* (2009.01)
(Continued)

(52) U.S. Cl.
CPC ........ *H04W 4/023* (2013.01); *G01C 21/3407* (2013.01); *G01C 21/362* (2013.01); *G01C 21/3617* (2013.01); *G01C 21/3688* (2013.01); *G01S 19/39* (2013.01); *G06F 21/88* (2013.01); *G08B 21/24* (2013.01); *H04W 4/027* (2013.01); *H04W 4/028* (2013.01); *H04W 24/08* (2013.01); *G01S 19/16* (2013.01); *G01S 19/34* (2013.01)

(58) Field of Classification Search
CPC ............ G01C 21/3407; G01C 21/3617; G01C 21/362; G01C 21/3688; G06F 21/88; G08B 21/24; H04W 24/08; H04W 4/023; H04W 4/027; H04W 4/028; H04W 64/00; G01S 19/16; G01S 19/34; G01S 19/39
USPC ....................................... 455/456.6
See application file for complete search history.

(56) References Cited

U.S. PATENT DOCUMENTS

| 6,580,978 B1 * | 6/2003 | McTamaney ........ G01C 21/165 342/385 |
| 2006/0105755 A1 | 5/2006 | Brandt |

(Continued)

FOREIGN PATENT DOCUMENTS

JP 2005-304002 A 10/2005

OTHER PUBLICATIONS

European Search Report dated Feb. 17, 2016.

*Primary Examiner* — Nathan Taylor
(74) *Attorney, Agent, or Firm* — Cha & Reiter, LLC.

(57) ABSTRACT

Disclosed herein are an electronic device and method. The electronic device includes a display, and a processor. The process may execute the method, which includes detecting, when the electronic device is moved from a first position to a second position, path information corresponding to a sequence of location changes according to movement of the electronic device from the first position to the second position, and controlling the display of the electronic device to display guide information including a generated path from the second position to the first position utilizing the detected path information.

15 Claims, 17 Drawing Sheets

(51) Int. Cl.
*H04W 4/02* (2009.01)
*G01C 21/34* (2006.01)
*G01C 21/36* (2006.01)
*G08B 21/24* (2006.01)
*G06F 21/88* (2013.01)
*G01S 19/39* (2010.01)
*G01S 19/16* (2010.01)
*G01S 19/34* (2010.01)

(56) References Cited

U.S. PATENT DOCUMENTS

| | | | | |
|---|---|---|---|---|
| 2006/0199534 | A1* | 9/2006 | Smith | G08B 21/023 |
| | | | | 455/41.2 |
| 2007/0174465 | A1* | 7/2007 | Huang | H04W 52/0261 |
| | | | | 709/227 |
| 2007/0249032 | A1* | 10/2007 | Pang | C07K 14/005 |
| | | | | 435/235.1 |
| 2007/0294032 | A1* | 12/2007 | Zumsteg | G01C 21/12 |
| | | | | 701/469 |
| 2008/0014967 | A1* | 1/2008 | Ishikawa | G08B 21/24 |
| | | | | 455/456.4 |
| 2010/0268454 | A1* | 10/2010 | Fountain | G01C 21/34 |
| | | | | 701/533 |
| 2011/0143810 | A1* | 6/2011 | Abe | G06F 1/1654 |
| | | | | 455/550.1 |
| 2012/0092266 | A1* | 4/2012 | Akella | G01C 21/3664 |
| | | | | 345/173 |
| 2012/0136529 | A1* | 5/2012 | Curtis | G01C 21/20 |
| | | | | 701/32.2 |
| 2014/0094123 | A1* | 4/2014 | Polo | H04W 52/0216 |
| | | | | 455/41.2 |
| 2014/0127988 | A1* | 5/2014 | Kang | H04W 4/02 |
| | | | | 455/11.1 |
| 2015/0296477 | A1* | 10/2015 | Pan | G06Q 10/08 |
| | | | | 455/456.1 |

* cited by examiner

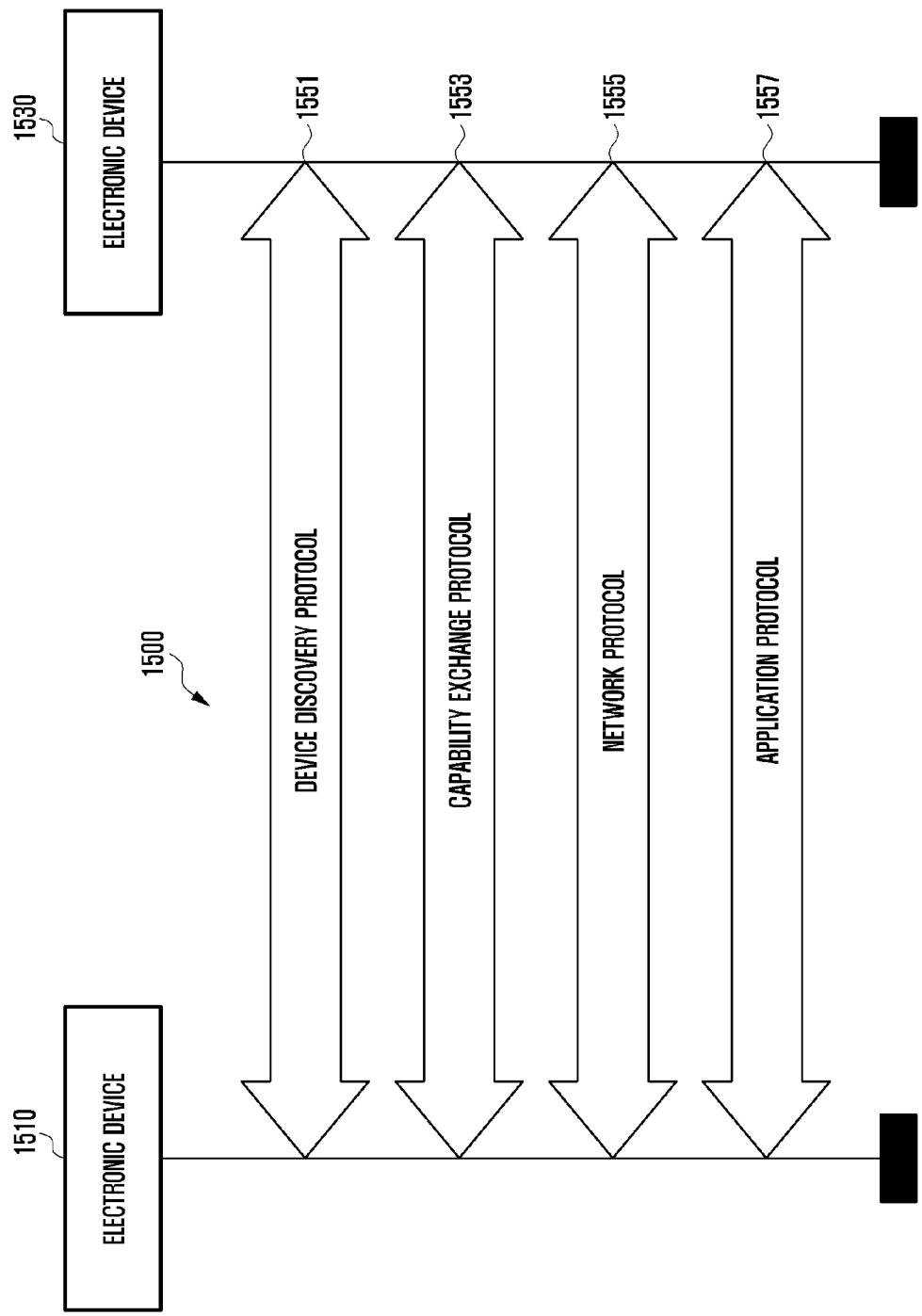

METHOD AND APPARATUS FOR PROVIDING LOCATION INFORMATION

CLAIM OF PRIORITY

This application claims the benefit under 35 U.S.C. §119(a) of a Korean patent application filed on Jun. 5, 2014 in the Korean Intellectual Property Office and assigned Serial No. 10-2014-0068159, the entire disclosure of which is hereby incorporated by reference.

TECHNICAL FIELD

The present disclosure relates to an electronic device. More particularly, the present disclosure relates to a method and apparatus for providing location information.

BACKGROUND

With advances in communication technologies, electronic devices may include one or more communication modules to support various wireless communication schemes such as 3G, LTE, Wi-Fi and Bluetooth. An electronic device may directly send and receive data to and from one or more external devices acting as an accessory such as a watch, earphone, head-mounted device (HMD) or wireless microphone, via various communication schemes. For example, through device-to-device (D2D) communication, the electronic device may directly send photographs, songs or other data to an external device, and directly receive various information from the external device.

SUMMARY

However, the electronic device may fail to communicate with the external device (e.g., through short-range D2D communication) owing to limitations on the distance therebetween. In such a case, the user may lose the external device. For example, assume that the user carries a smartphone and an electronic watch that communicate with each other. When the user wearing the electronic watch places the smartphone at a first location (e.g., conference room) and moves to a second location (e.g., rest room), the electronic watch and the smartphone may fail to communicate with each other owing to distance limitations. Additionally, as it is not possible to control functions of the smartphone (e.g., generation of sound or vibration, or screen blinking) through D2D communication, the user may have difficulty in locating the smartphone. For example, the user wearing the electronic watch may forget the exact location where the smartphone is placed or may experience difficulty in finding the path from the current location to the location where the smartphone is placed.

In addition, to communicate with an external device, the electronic device periodically detects or scans for a signal sent from the external device. The electronic device may repeatedly attempt to detect a signal from the external device even when communication therebetween is not possible owing to distance limitations. This may cause an unnecessary increase in power consumption of the electronic device. When the external device is missing, the electronic device may repeatedly search for the external device on the same cycle regardless of the present location of the electronic device, resulting in poor search efficiency.

Accordingly, one aspect of the present disclosure is to provide a method and electronic device that can identify a path for movement leading to an external device on the basis of location information of the external device and output guide information toward the external device (e.g., movement direction or distance to the external device) for the user. Another aspect of the present disclosure is to provide a method and electronic device that can find, when an external device is missing, the external device on the basis of a search cycle that is adjusted according to the location of the electronic device.

In one aspect of the present disclosure, a method in an electronic device is provided including detecting, when the electronic device is moved from a first position to a second position, path information corresponding to a sequence of location changes according to movement of the electronic device from the first position to the second position, and controlling, by a processor, a display of the electronic device to display guide information including a generated path from the second position to the first position utilizing the detected path information.

In one aspect of the present disclosure, an electronic device is provided. The electronic device may include a display; and a processor configured to detect, when the electronic device is moved from a first position to a second position, path information corresponding to a sequence of location changes according to movement of the electronic device from the first position to the second position, and control the display of the electronic device to display guide information including a generated path from the second position to the first position utilizing the detected path information.

In a another aspect of the present disclosure, an electronic device, including one or more sensors configured to detect a location of the electronic device; and a processor configured to detect a signal transmitted from an external device according to a scan cycle, wherein the scan cycle is adjusted by the processor according to the detected location.

BRIEF DESCRIPTION OF THE DRAWINGS

The present disclosure will be more apparent from the following detailed description taken in conjunction with the accompanying drawings, in which:

FIG. 15 illustrates example communication protocols between electronic devices according to various embodiments of the present disclosure.

DETAILED DESCRIPTION

Figure 1:
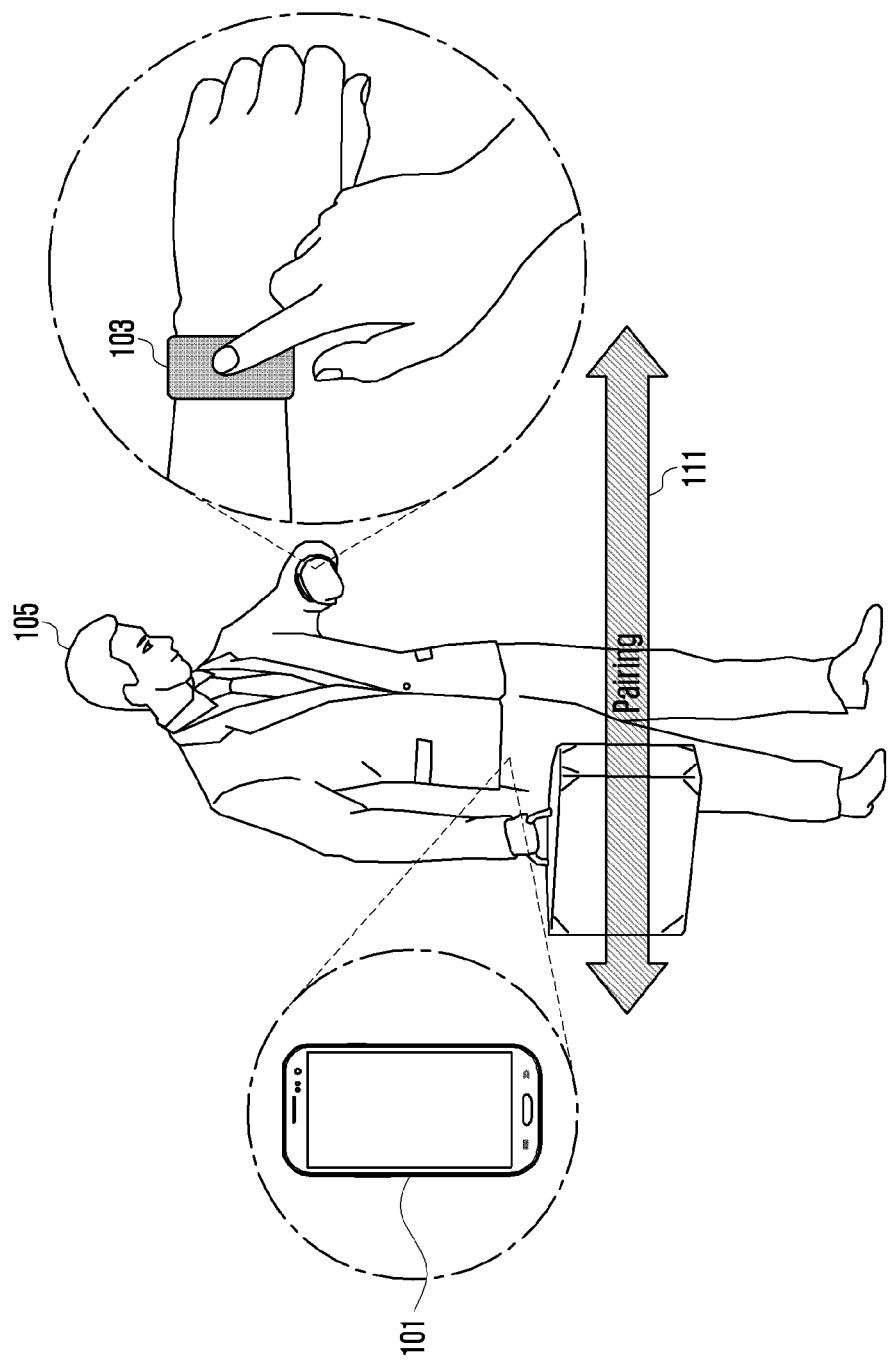
FIG. 1 illustrates a multiple electronic devices being utilized by a user according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the present disclosure. The same or similar reference symbols are used throughout the drawings to refer to the same or like parts.

It will be understood that the expressions "comprises" and "may comprise" is used to specify presence of disclosed function, operation, component, etc. but do not preclude the presence of one or more functions, operations, components, etc. It will be further understood that the terms "comprises" and/or "has" when used in this specification, specify presence of stated feature, number, step, operation, component, element, or a combination thereof but do not preclude the presence or addition of one or more other features, numbers, steps, operations, components, elements, or combinations thereof. In the present disclosure, the expression "and/or" is taken as specific disclosure of each and any combination of enumerated things. For example, A and/or B is to be taken as specific disclosure of each of A, B, and A and B.

In various embodiments of the present disclosure, unless expressly stated to the contrary, "or" refers to an inclusive or and not to an exclusive or. For example, a condition A or B may be satisfied by any one of the following: A is true (or present) and B is false (or absent), A is false (or absent) and B is true (or present), and both A and B are true (or present).

As used herein, terms such as "first," "second," etc. are used to describe various components, however, it is obvious that the components should not be defined by these terms. For example, the terms do not restrict the order and/or importance of the corresponding components. The terms are used for distinguishing one component from another component. For example, a first component may be referred to as a second component and likewise, a second component may also be referred to as a first component, without departing from the teaching of the inventive concept.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. On the contrary, it is to be noticed that the words "directly coupled" or "directly connected" should be interpreted as being restricted to direct connections only without an intervening element or means.

The terminology used herein is for the purpose of describing particular embodiments and is not intended to be limiting of the disclosure. As used herein, the singular forms "a," "an" and "the" are intended to include the plural forms as well, unless the context clearly indicates otherwise.

Unless otherwise defined herein, all terms including technical or scientific terms used herein have the same meanings as commonly understood by those skilled in the art to which the present disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

According to various embodiments of the present disclosure, the electronic device may include devices having an operation support function. Examples of the electronic device may include smartphone, table Personal Computer (PC), mobile phone, video phone, electronic book (e-book) reader, desktop PC, laptop PC, netbook computer, Personal Digital Assistant (PDA), Portable Multimedia Player (PMP), MP3 player, mobile medical appliance, camera, wearable device (e.g., head-mounted device (HMD) such as electronic glasses, electronic clothing, electronic bracelet, electronic necklace, electronic appcessory, electronic tattoo, smartwatch, etc.

According to an embodiment, the electronic device may be one of smart home appliances having operation support function. Examples of the smart electronic appliance as an electronic device may include television, Digital Video Disk (DVD) player, audio player, refrigerator, air-conditioner, vacuum cleaner, electronic oven, microwave oven, laundry machine, air cleaner, set-to box, TV box (e.g., Samsung HomeSync™, apple TV™, and google TV™), game console, electronic dictionary, electronic key, camcorder, and electronic frame, etc.

According to an embodiment, examples of the electronic device may include medical device (e.g., Magnetic Resonance Angiography (MRA), Magnetic Resonance Imaging (MRI), Computed Tomography (CT)), Navigation device, Global Positioning System (GPS) receiver, Event Data Recorder (EDR), Flight Data Recorder (FDR), car infotainment device, maritime electronic device (e.g., maritime navigation device and gyro compass), aviation electronic device (avionics), security device, vehicle head unit, industrial or home robot, Automatic Teller's Machine (ATM) of financial institution, Point Of Sales (POS), etc.

According to an embodiment, examples of the electronic device may include furniture and building/structure having a communication function, electronic board, electronic signature receiving device, projector, and metering device (e.g., water, electric, gas, and electric wave metering devices).

According to various embodiments, the electronic device may be any combination of the aforementioned devices. According to various embodiments of the present disclosure, the electronic device may be a flexible device. It is obvious to those skilled in the art that the electronic device is not limited to the aforementioned devices.

Descriptions are made of the electronic devices according to various embodiments with reference to accompanying drawings hereinafter. The term 'user' used in various embodiments may denote a person or a device (e.g., artificial intelligent electronic device) using the electronic device.

FIG. 1 illustrates a situation where multiple electronic devices are utilized by a user according to various embodiments.

Referring to FIG. 1, multiple electronic devices including a primary electronic device 101 and a secondary electronic device 103 disposed at different portions of the user 105 may be communicatively coupled by a connection 111 (e.g., wireless D2D communication). For example, the primary electronic device 101 and the secondary electronic device 103 may be wirelessly linked (or paired) with each other through Wi-Fi, NFC or Bluetooth. The primary electronic device 101 and the secondary electronic device 103 may directly exchange information (e.g., location information) through the connection 111.

In one embodiment, when the strength of a signal (e.g., radio frequency "RF" signal) related with the connection 111 (e.g., received signal strength indicator "RSSI") is within a designated range, the primary electronic device 101 may send location information indicating the current location of the primary electronic device 101 (e.g., global positioning system "GPS" information) to the secondary electronic device 103. Or, when the strength of a signal related with the connection 111 is within the designated range, the secondary electronic device 103 may send location information indicating the current location of the secondary electronic device 103 (e.g., GPS information) to the primary electronic device 101. Here, the designated range may indicate a signal strength range where the signal strength related with the connection 111 is not maintained constant but gradually decreases. The signal strength is described in more detail later in connection with FIG. 5.

In one embodiment, the primary electronic device 101 or secondary electronic device 103 may be carried (e.g., held by the hand) or be worn (e.g., attached to a portion of the body as a wearable device) by the user 105. The primary electronic device 101 or secondary electronic device 103 may be implanted into the body of the user 105 (e.g., as a tattoo, skin implant or hair implant). Examples of a wearable device may include an electronic hat, electronic glasses such as a head mounted display (HMD), electronic necklace, electronic belt, electronic watch such as a smart watch, electronic bracelet, electronic ring, electronic footwear, electronic clothes, and/or electronic tattoo.

Figure 2A:
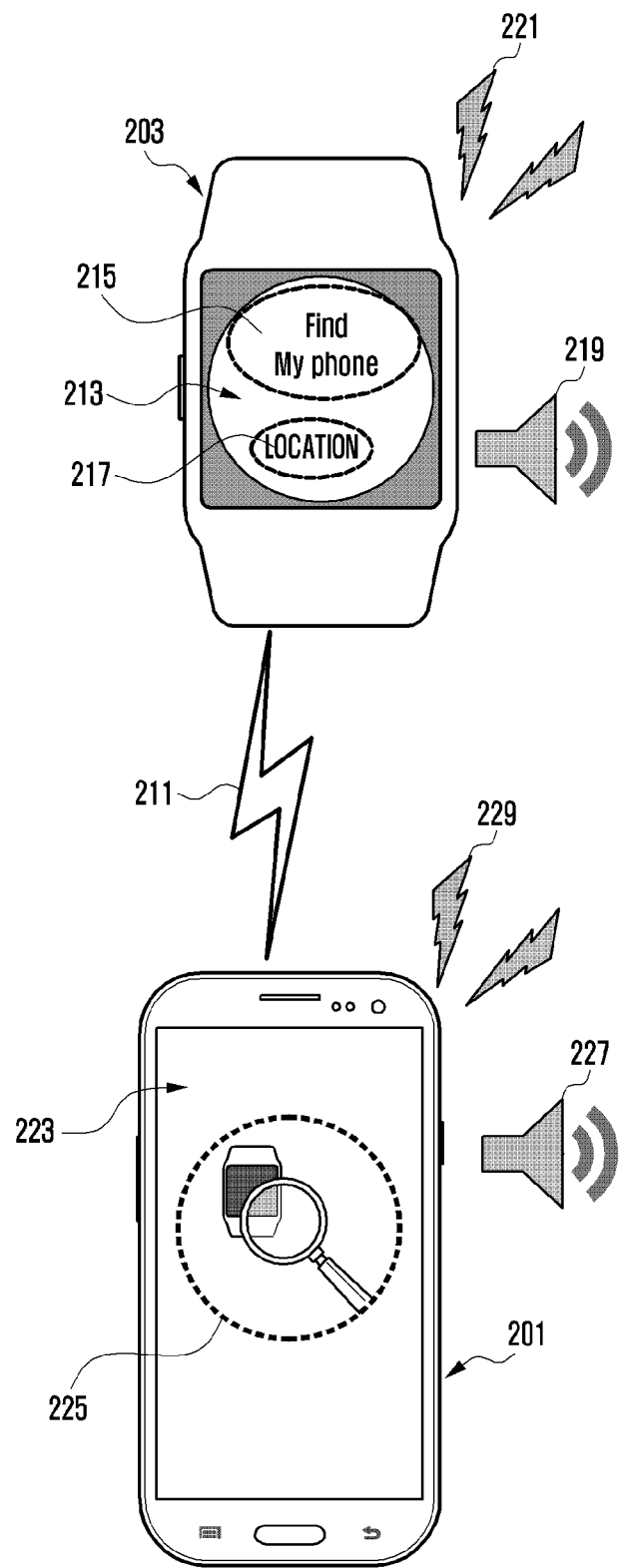
FIG. 2A and FIG. 2B illustrate example execution of applications through a primary electronic device and a secondary electronic device according to various embodiments of the present disclosure.

FIG. 2A illustrates execution of a device search application through a primary electronic device 201 (e.g., primary electronic device 101) and a secondary electronic device 203 (e.g., secondary electronic device 103) according to various embodiments.

Referring to FIG. 2A, the primary electronic device 201 and the secondary electronic device 203 may be involved in a connection 211 (e.g., connection 111). Although the connection 211 is maintained between the primary electronic device 201 and the secondary electronic device 203, the user (e.g., user 105) wearing, holding or embedding the secondary electronic device 203 may fail to locate the primary electronic device 201 owing to various reasons such as the location of the primary electronic device 201 and the distance between the primary electronic device 201 and the secondary electronic device 203. In this case, to identify the location of the primary electronic device 201, the user may execute a device search application 215 on the secondary electronic device 203.

Here, the device search application is an application that can be used by a first electronic device (e.g., secondary electronic device 203) to identify the location or whereabouts of a second electronic device (e.g., primary electronic device 201) or be used to find a path for movement from the location of the first electronic device to the location of the second electronic device. When the device search application 215 is executed on the secondary electronic device 203, various information indicating the whereabouts or location of the primary electronic device 201 (referred to as "location notification information") may be provided or output to the user via at least one of the primary electronic device 201 or the secondary electronic device 203, so that the user is readily aware of the primary electronic device 201.

The primary electronic device 201 may output location notification information through functionally connected output units so as to attract attention of the user via a visual, auditory, tactile or olfactory means. For example, the primary electronic device 201 may activate the display 223 if it was previously deactivated, blink display of the screen of the display 223 (e.g., rapidly activate and deactivate the display), or output visual information 225 on the display 223. The primary electronic device 201 may also provide the location notification information to the user through sounds or vibrations as indicated by elements 227 or 229.

Although not shown, the primary electronic device 201 may notify its whereabouts to the user by emitting a sweet fragrance through a functionally connected fragrance emission unit. The secondary electronic device 203 may send a notification indicating execution of the device search application 215 to the primary electronic device 201 through the connection 211, enabling the primary electronic device 201 to output the location notification information.

In one embodiment, when the device search application 215 is executed, the secondary electronic device 203 may provide the user with the location information (e.g., GPS information) of the primary electronic device 201 through a functionally connected output unit. For example, the secondary electronic device 203 may output the location information of the primary electronic device 201 by use of at least one of visual information 217 through the display 213, sound information 219 through a speaker, or vibration information 221 through a vibration generator. In addition, to help the user move from the current location to the location of the primary electronic device 201, the secondary electronic device 203 may provide guide information indicating the movement direction or distance through an output unit. The guide information is described in more detail later in connection with FIG. 2B.

In one embodiment, at least one of the primary electronic device 201 or the secondary electronic device 203 may provide a notification indicating execution of the device search application 215. For example, the secondary electronic device 203 may provide the user with a notification indicating execution of the device search application 215 by use of at least one of visual information through the display 213, sounds through a speaker, vibration through a vibration generator, or sweet fragrance through a fragrance emission unit.

In one embodiment, the secondary electronic device 203 may automatically initiate execution of the device search application 215 according to the signal strength for the connection 211. For example, when the signal strength for the connection 211 is within a designated range (e.g., a range where the signal strength for the connection 211 is not maintained constant but gradually decreases), the secondary electronic device 203 may automatically execute the device search application 215 without an execution request from the user. In the secondary electronic device 203, automatic execution of the device search application 215 may be restricted according to user or designer settings. For example, although automatic execution is configured for the device search application 215, when automatic execution of the device search application 215 is restricted by user settings, the secondary electronic device 203 may initiate execution of the device search application 215 upon user request.

In one embodiment, the secondary electronic device 203 may execute the device search application 215 in response to a user request. When user input for executing the device search application 215 is detected, the secondary electronic device 203 may execute the device search application 215 accordingly. For example, when the user wearing the secondary electronic device 203 is unaware of the location of the primary electronic device 201, the user may execute the device search application 215 on the secondary electronic device 203 to thereby identify the whereabouts or location of the primary electronic device 201 through at least one of the primary electronic device 201 or the secondary electronic device 203.

Figure 2B:
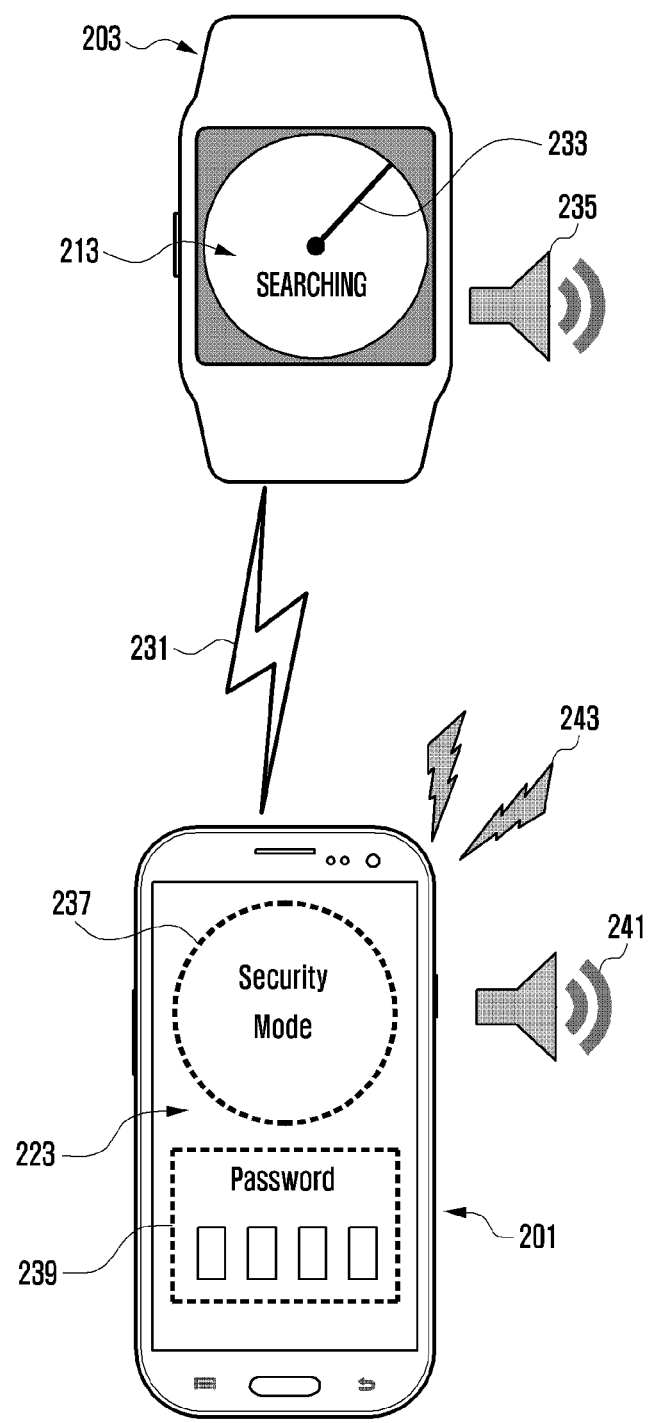

FIG. 2B illustrates example execution of a device search application through a primary electronic device 201 (e.g., primary electronic device 101) and a secondary electronic device 203 (e.g., secondary electronic device 103) according to various embodiments of the present disclosure. The same or similar reference symbols are used in FIGS. 2A and 2B to refer to the same or like elements.

Referring to FIG. 2B, the connection (e.g., connection 211) between the secondary electronic device 203 and the primary electronic device 201 may be disconnected or broken (and referred to here as "disconnection 231"), so that one of the primary electronic device 201 and the secondary electronic device 203 is unable to detect a signal from the other device thereof.

The disconnection 231 may be a result of communication release (e.g., closure of NFC, Wi-Fi or Bluetooth communication) or a result of restrictions and/or limitations on the distance between the primary electronic device 201 and the secondary electronic device 203. One example would be link loss in which one of the primary electronic device 201 and the secondary electronic device 203 is unable to sense a signal from the other thereof, because of interference or distance greater than the threshold for the respective communication signals. For instance, the user wearing the secondary electronic device 203 may place the primary electronic device 201 at a position (e.g., $15^{th}$ floor of a building) and move to another position (e.g., $20^{th}$ floor of the building). In this case, the secondary electronic device 203 may be unable to receive a signal from the primary electronic device 201 owing to restrictions on the distance therebetween.

In one embodiment, when the device search application 215 is executed in a state of disconnection 231, the secondary electronic device 203 may provide the user with guide information for movement (e.g., direction or distance) from the current location (e.g., position at which the device search application 215 is executed) to a region in which the primary electronic device 201 is placed (referred to as "primary region") on the basis of the location information of the primary electronic device 201. For example, the secondary electronic device 203 may provide information on movement direction or distance to the primary region as visual information 233 on the display 213 or as sound information 235 through a speaker.

When the secondary electronic device 203 arrives at the primary region according to the guide information, the primary electronic device 201 may provide the location notification information via sound, vibration, or screen brightness adjustment. Hence, the user of the secondary electronic device 203 may be readily aware of the primary electronic device 201.

When the signal strength for the connection 211 is within a first designated range (where the signal strength for the connection 211 is not maintained constant but gradually decreases), the location information of the primary electronic device 201 may be obtained from the primary electronic device 201 through the connection 211. Here, the location information may include absolute coordinate information such as latitude, longitude, or GPS data of the primary electronic device 201, or descriptive information such as the name of the building in which the primary electronic device 201 is located, floor number, or position.

In a state of disconnection 231, one of the primary electronic device 201 and the secondary electronic device 203 may adjust the scan cycle for finding the other thereof. For example, when the primary electronic device 201 fails to receive a signal from the secondary electronic device 203, the primary electronic device 201 may adjust a cycle for signal scanning on the basis of location information of the primary electronic device 201. For example, assume that the user frequently visits a first position and a second position. Then, it is possible to adjust the scan cycle according to the location and the frequency of visit. Specifically, when determined as being located at the first position on the basis of the location information of the primary electronic device 201, the primary electronic device 201 may scan the secondary electronic device 203 according to a first cycle. When determined as being located at the second position, the primary electronic device 201 may scan the secondary electronic device 203 according to a second cycle longer than the first cycle.

In one embodiment, when the signal strength of a signal from the secondary electronic device 203 is within a second designated range (e.g., very weak signal, oscillation between success and failure of signal detection, or complete failure of signal detection), the primary electronic device 201 may operate in security mode 237. In security mode 237, a locking application may be activated that restricts the functionality of the primary electronic device 201 so that the primary electronic device 201 can be controlled when the user (e.g., user wearing the secondary electronic device 203) is authenticated by the primary electronic device 201. That is, user authentication is requested to execute or manipulate an application installed in the primary electronic device 201 or to adjust the screen brightness, volume or other function of the primary electronic device 201.

User authentication on the primary electronic device 201 may be performed by, for example, entering a password into a password field 239. Although not shown, user authentication may also be performed using various biometric information of a user, such as fingerprint, iris, biosignal, hair, pulse rate and heart rate. When security mode 237 is activated, the primary electronic device 201 may provide a notification indicating security mode activation in the form of visual information such as the password field 239, sound 241 or vibration 243.

In one embodiment, the state of disconnection 231 may refer to a state of broken connection or a state of connection release. The state of broken connection may be a result of restrictions on the distance (e.g., first threshold distance) between the primary electronic device 201 and the secondary electronic device 203 wherein one of the primary electronic device 201 and the secondary electronic device 203 is unable to sense a signal from the other thereof. For example, the state of broken connection may correspond to link loss. In a state of broken connection, when the distance between the primary electronic device 201 and the secondary electronic device 203 becomes less than a second threshold distance (e.g., the primary electronic device 201 and the secondary electronic device 203 are able to sense RF signals from each other), the primary electronic device 201 and the secondary electronic device 203 may send and receive data to and from each other without connection re-setup (e.g., entering personal identification number (PIN) information to the primary electronic device 201).

For example, when the distance between the primary electronic device 201 and the secondary electronic device 203 is less than the second threshold distance, the primary electronic device 201 may find one or more external devices including the secondary electronic device 203 through signal scanning, and select the secondary electronic device 203 for communication among the found external devices.

The state of connection release may correspond to deactivation of a communication module (e.g., communication interface 360) between the primary electronic device 201 and the secondary electronic device 203. In a state of connection release, even when the distance between the primary electronic device 201 and the secondary electronic device 203 is less than the second threshold distance, the primary electronic device 201 may be unable to receive a signal from the secondary electronic device 203. In this case, the primary electronic device 201 may activate the communication module to reestablish a connection to the secondary electronic device 203 and communicate with the secondary electronic device 203.

In various embodiments, the words "primary electronic device" or "secondary electronic device" are used for ease of description, and do not have a specific meaning in relation with functions of electronic devices. For example, an electronic device (e.g., smartphone) referred to as a primary electronic device may be referred to as a secondary electronic device, and an electronic device (e.g., electronic watch) referred to as a secondary electronic device may be referred to as a primary electronic device.

Figure 3:
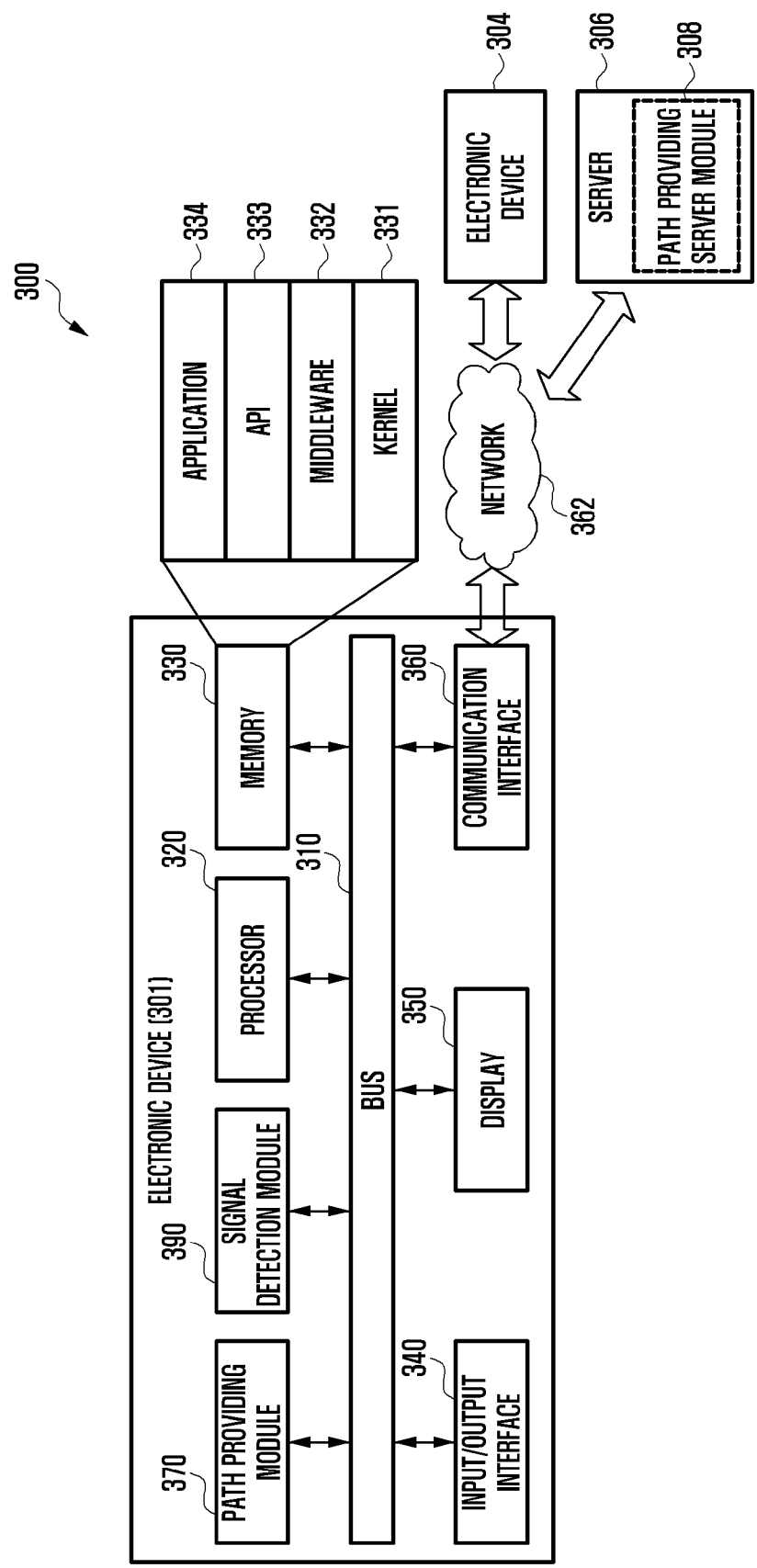
FIG. 3 illustrates an example network environment including electronic devices according to various embodiments of the present disclosure.

FIG. 3 is an example diagram illustrating a network environment 300 including electronic devices 301 according to various embodiments of the present disclosure.

Referring to FIG. 3, the electronic device 301 (e.g., a primary electronic device 201 or a secondary electronic device 203) may include a bus 310, a processor 320, a memory 330, an input/output interface 340, a display 350, a communication interface 360, a path providing module 370 and a signal detection module 390.

The bus 310 connects the aforementioned components to each other and may be a circuit of exchanging signals (e.g., control messages) among the components.

For example, the processor 320 receives a command from any of the aforementioned components (e.g., memory 330, input/output interface 340, display 350, communication interface 360, path providing module 370 and signal detection module 390) through the bus 310, interprets the command, and executes operation or data processing according to the decrypted command.

The memory 330 may store the command or data received from the processor 320 or other components (e.g., input/output interface 340, display 350, communication interface 360, path providing module 370 and signal detection module 390, etc.) or generated by the processor 320 or other components. The memory 330 may store program modules including kernel 331, middleware 332, Application Programming Interface (API) 333, applications 334, etc. Each programming module may be implemented as software, firmware, hardware, and any combination thereof.

The kernel 331 may control or manage the system resources (e.g., bus 310, processor 320, and memory 330) for use in executing the operation or function implemented with the middleware 332, the API 333, or the application 334. The kernel 331 also may provide an interface allowing the middleware 332, API 333, or application 334 to access the components of the electronic device 301 to control or manage.

The middleware 332 may serve as an intermediary so that the API 333 or the application 334 may transceive data while communicating with the kernel 331. Further, in relation to work requests received from the plurality of applications 334, the middleware 332 may perform load balancing on the work requests by using, for example, a method of assigning a priority for using the system resource (for example, the bus 310, the processor 320, or the memory 330) of the electronic device 301 to at least one application among the plurality of applications 334.

The API 333 is an interface, through which the application 334 may control a function provided from the kernel 331 or the middleware 332, and may include at least one interface or function, for example, file control, window control, image processing, or character control.

According to various embodiments, the applications 334 may include Short Messaging Service/Multimedia Messaging Service (SMS/MMS) application, email application, calendar application, alarm application, health care application (e.g., application of measuring quantity of motion or blood sugar level), and environmental information application (e.g., atmospheric pressure, humidity, and temperature applications). Additionally or alternatively, the application 334 may be an application related to information exchange between the electronic device 301 and other external electronic device (e.g., electronic device 304). Examples of the information exchange application may include a notification relay application for relaying specific information to the external electronic device and a device management application for managing the external electronic device.

For example, the notification relay application may be provided with a function of relaying the alarm information generated by the other applications (e.g., SMS/MMS application, email application, health care application, and environmental information application) of the electronic device 301 to an external electronic device (e.g., electronic device 304). Additionally or alternatively, the notification relay application may provide the user with the notification information received from an external electronic device (e.g., electronic device 304). The electronic device application may manage (e.g., install, delete, and update) the function of an external electronic device (e.g., turn-on/off of the electronic device 304 itself (or a part of it) or adjustment of the brightness (or resolution) of the display) which communicates with the electronic device 301 or the service (e.g., communication or messaging service) provided by the external electronic device or an application running on the external device.

According to various embodiments, the applications 334 may include an application designated according to the property (e.g., type) of an external electronic device (electronic device 304). If the external electronic device is the MP3 player, the applications 334 may include a music playback application. Similarly, if the external electronic device is a mobile medical appliance, the applications 334 may include a heal care application. According to an embodiment, the application 334 may include at least one of applications designated to the electronic device 301 or the applications received from the external electronic device (e.g., server 306 and electronic device 304).

The input/output interface 340 delivers the command or data input by the user through with an input/output device (e.g., sensor, keyboard, and touchscreen) to the processor 320, memory 330, communication interface 360, path providing module 370 and/or signal detection module 390 through the bus 310. For example, the input/output interface 340 may provide the processor 320 with the data corresponding to the touch may by the user on the touchscreen. The input/output interface 340 may output the command or data (which is received from the processor 320, memory 330, communication interfaced 360, path providing module 370 or signal detection module 390 through the bus 310) through the input/output device (e.g., speaker and display). For example, the input/out interface 340 may output the voice data processed by the processor 320 to the user through the speaker.

The display 350 may present various information (e.g., multimedia data and text data) to the user.

The communication interface 360 may establish a communication connection of the electronic device 301 with an external device (e.g., electronic device 304 and server 306). For example, the communication interface 360 connects to the network 362 through a wireless or wired link for communication with the external device. Examples of the wireless communication technology may include wireless fidelity (Wi-Fi), Bluetooth (BT), Near Field Communication (NFC), Global Positioning System (GPS), and cellular communication technology (e.g., Long Term Evolution (LTE), LTE-Advanced (LTE-A), Code Division Multiple Access (CDMA), Wideband CDMA (WCDMA), Universal Mobile Telecommunication System (UMTS), Wireless-Broadband (WiBro), and General System for Mobile communications (GSM)). Examples of the wired communication technology may include Universal Serial Bus (USB), High Definition Multimedia Interface (HDMI), Recommended Standard 232 (RS-232), and Plain Old Telephone Service (POTS).

According to an embodiment, the network 362 may be a telecommunication network. The communication network may include at least one of computer network, Internet, Internet of Things, or telephone network. According to an embodiment, the communication protocol between the electronic device 131 and an external device (e.g., transport layer protocol, data link layer protocol, and physical layer protocol) may be supported by at least one of the applications 334, API 333, middleware 332, kernel 331, or communication interface 360.

In one embodiment, the server 306 may support operation of the electronic device 301 by executing at least one of functions or operations of the electronic device 301. For example, to support the path providing module 370 of the electronic device 301, the server 306 may include a path providing server module 308. That is, the path providing server module 308 and the path providing module 370 include at least one common element, and the path providing server module 308 may execute at least one of operations of the path providing module 370 (i.e., the providing server module 308 may act on behalf of the path providing module 370). Although not shown, the server 306 and the signal detection module 390 include at least one common element, and the server 306 may at least partially support execution of the signal detection module 390.

The path providing module 370 may process information obtained from the other components (e.g., processor 320, memory 330, input/output interface 340, and communication interface 360) and provide the processed information to the user in various ways. For example, when the electronic device 301 is moved, the path providing module 370 may identify path information in accordance with changes in the location of the electronic device 301 with or without the help of the processor 320. The path providing module 370 may provide guide information corresponding to the path information to the user of the electronic device 301.

In one embodiment, on the basis of location information of an external electronic device (e.g., electronic device 304), the path providing module 370 may provide guide information for movement from the current location of the electronic device 301 to a primary region in which the external electronic device is placed. Hence, the user may move from the current location to the primary region with reference to the guide information. One instance of the path providing module 370 may be included in the server 306 as a path providing server module 308. Hence, the server 306 may perform at least operation on behalf of the path providing module 370.

The signal detection module 390 may scan a signal from an external electronic device (e.g., electronic device 304) while varying the scan cycle according to the location of the electronic device 301. For example, when the electronic device 301 fails to detect a signal from an external electronic device, the signal detection module 390 may perform signal scanning according to a scan cycle determined based on the location of the electronic device 301.

The electronic device 301 may not include one of the path providing module 370 and the signal detection module 390 according to the functional, operational or performance configuration. That is, the electronic device 301 may include the path providing module 370, include the signal detection module 390, or include both the path providing module 370 and the signal detection module 390.

Hereinafter, the operation and function of the path providing module 370 are described in more detail first, and then the operation and function of the signal detection module 390 are described in more detail. Next, the path providing module 370 is described further with reference to FIGS. 4 to 10.

Figure 4:
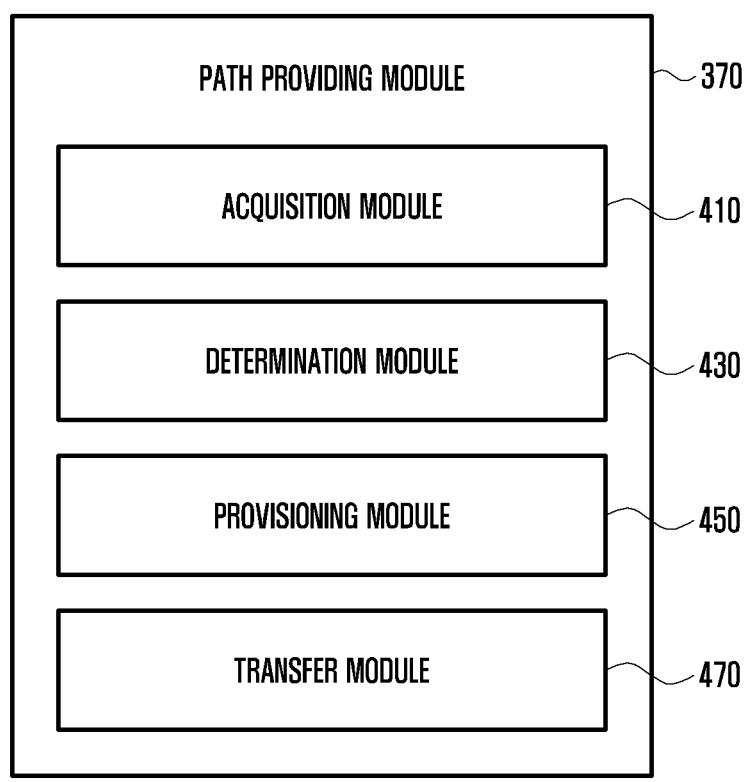
FIG. 4 is a block diagram of an example path providing module of an electronic device according to various embodiments of the present disclosure.

FIG. 4 is a block diagram of an example path providing module 370 of an electronic device (e.g., electronic device 301 referred to as "secondary electronic device") according to various embodiments of the present disclosure.

Referring to FIG. 4, the path providing module 370 may include an acquisition module 410, a determination module 430, a provisioning module 450, and a transfer module 470.

The acquisition module 410 may obtain location information corresponding to the location of an external device (e.g., electronic device 304 referred to as "primary electronic device"). In one embodiment, the acquisition module 410 may receive location information from the primary electronic device when the signal strength (e.g., RSSI) for communication between the secondary electronic device and the primary electronic device (e.g., Bluetooth, Wi-Fi or NFC) is within a designated range. For example, the signal strength may be classified into "high" (e.g., strong), "medium" (e.g., weak) and "low" (e.g., undetected) in consideration of the distance between the primary electronic device and the secondary electronic device. When the signal strength is medium, the location information may be automatically received from the primary electronic device. Alternatively, the location information may be automatically received from the primary electronic device when the signal strength corresponds to a specified value without range classification.

In one embodiment, the acquisition module 410 may receive location information from the primary electronic device when a request is issued for releasing the connection with the primary electronic device. For example, when the primary electronic device receives a request for deactivating the Bluetooth module, the primary electronic device may send location information thereof to the secondary electronic device before deactivation of the Bluetooth module. As another example, when the secondary electronic device receives a request for deactivating the Bluetooth module, the secondary electronic device may notify the primary electronic device. In response to this notification, the primary electronic device may send location information thereof to the secondary electronic device.

The location information may be updated according to movement of the primary electronic device. For example, the primary electronic device may be moved from a first position (e.g., living room) to a second position (e.g., rest room). In this case, the acquisition module 410 may receive first location information corresponding to the first position from the primary electronic device, and receive second location information corresponding to the second position as updated location information from the primary electronic device.

In one embodiment, the location information may be received directly from the primary electronic device through D2D communication. Alternatively, the location information may be received from a server (e.g., server 306) through a network (e.g., network 362). To this end, the primary electronic device may provide location information thereof to the server. The location information obtained from the primary electronic device or the server may be stored in a memory (e.g., memory 330). The location information may include mathematical location data such as latitude, longitude, altitude, and/or GPS data. The GPS data may include information regarding not only latitude, longitude and altitude but also speed and acceleration of the primary electronic device. The location information may further include position information such as address, building name and floor number corresponding to the place at which the primary electronic device is located.

The determination module 430 may identify path information for changes in the location of the secondary electronic device in accordance with movement of the secondary electronic device. For example, when the secondary electronic device is moved from a first position to a second position, the determination module 430 may obtain path information regarding the direction or distance of movement from the first position to the second position. In one embodiment, the path information may be automatically obtained when the signal strength for the connection between the secondary electronic device and the primary electronic device is within a designated range. For example, when the secondary electronic device fails to receive a signal from the primary electronic device, the determination module 430 may obtain path information by tracking the path of movement of the secondary electronic device.

The path information may include relative location information determined in consideration of movement of the secondary electronic device with respect to the location information of the primary electronic device (e.g., direction or distance of movement of the secondary electronic device with respect to the location such as a primary region of the primary electronic device). For example, when the primary electronic device is located at position A, the location information indicates position A. Thereafter, when the secondary electronic device is moved about 5 m eastward from position A, the relative location information may include "east" as direction information and "about 5 m" as distance information with respect to position A.

When the secondary electronic device is moved in a successive manner, the determination module 430 may obtain path information in a piecewise manner relative to the location information of the primary electronic device. For example, path information may include first path information corresponding to a first segment of the movement and second path information corresponding to a second segment thereof. Here, the first path information may be relative location information determined according to the first segment movement with respect to the location information of the primary electronic device, and the second path information may be relative location information determined according to the second segment movement with respect to the first path information.

For example, assume that the secondary electronic device is moved from position A, that is, the location of the primary electronic device, about 5 m eastward to position B first, and then moved from position B about 10 m northward to position C. Then, the determination module 430 may obtain information on the movement direction or distance for position B and position C in sequence as path information. Here, path information for position B may be relative location information obtained relative to position A, and path information for position C may be relative location information obtained relative to position B.

The path information for position C may include at least one of "north" as direction information and "about 10 m" as distance information with respect to position B. Here, the path information for position C is location information determined with respect to path information for position B related with location information of position A, and may be indirectly related with the location information of position A. In another embodiment, the path information for position C may include location information directly related with the location information of position A. For example, as to the secondary electronic device, if northward movement of about 10 m from position B corresponds to northeastward movement of about 12 m, the path information for position C may include "northeast" as direction information or "about 12 m" as distance information with respect to position A.

In one embodiment, when the secondary electronic device is moved from a first position to a second position, if the direction change or distance of the movement is less than a threshold value, the determination module 430 may obtain path information for the first position or second position. For example, when the secondary electronic device is moved from the first position (such as the location of the primary electronic device) about 15 cm eastward to the second position, the determination module 430 may ignore path information for the second position. That is, the determination module 430 may not obtain path information for the second position. This is because the movement distance of about 15 cm (i.e., less than one step length) has no real influence on a search for the primary electronic device.

On the other hand, when the secondary electronic device is moved from a first position about 3 m eastward to a second position, the determination module 430 may obtain path information for the second position (e.g., 3 m eastward from the first position). This is because the movement distance of about 3 m would have an influence on user's search for the primary electronic device.

When the direction of movement of the secondary electronic device to a first position is the east and the error in direction for movement from the first position to a second position is ±0.1 degrees relative to the east, the determination module 430 may ignore the movement direction leading to the second position. In this case, the determination module 430 may obtain path information for the second position by maintaining information on the direction of movement up to the first position and increasing the numeric value indicating the distance of eastward movement. On the other hand, when the direction of movement of the secondary electronic device to a first position is the east and the error in direction for movement from the first position to a second position is ±10 degrees relative to the east (e.g., northeast), the determination module 430 may obtain path information for the first position and path information for the second position. In various embodiments, path information may be obtained by use of various sensors such as an acceleration sensor, geomagnetic sensor, and gyro sensor.

The provisioning module 450 may provide guide information corresponding to the path of movement of the secondary electronic device on the basis of the path information. For example, when the secondary electronic device is moved from a first position to a second position, the provisioning module 450 may produce guide information corresponding to the path from the first position to the second position on the basis of the path information. The guide information may be information that informs the user of the movement direction or distance so that the user of the secondary electronic device can move from the current location to the location at which the primary electronic device is placed (e.g., primary region whose location information has been obtained by the secondary electronic device).

In one embodiment, the provisioning module 450 may output the guide information in reverse of the order in which the path information is obtained. For example, when first path information and second path information are obtained in sequence according to movement of the secondary electronic device, the provisioning module 450 may output first guide information corresponding to the first path information and second guide information corresponding to the second path information in reverse of the order in which the first path information and second path information were obtained. That is, the provisioning module 450 may sequentially output the second guide information and the first guide information.

The provisioning module 450 may output information indicating the opposite of the direction of movement of the secondary electronic device (e.g., movement from a first position to a second position) as a portion of the guide information. That is, the guide information may indicate an opposite direction of the movement direction corresponding to the path information. For example, when first path information indicates the east, first guide information corresponding to the first path information may indicate the west. When second path information indicates the south, second guide information corresponding to the second path information may indicate the north. Hence, it is possible to inform the user of the path from the location of the primary electronic device to the current location of the secondary electronic device (that is, in reverse of the movement direction of the user wearing the secondary electronic device), thereby helping the user move to the primary region in which the primary electronic device is located.

In one embodiment, when a request related with the primary electronic device is issued, the provisioning module 450 may output the guide information. Such a request may be related to execution of a device search application on the secondary electronic device to search for the primary electronic device. For example, an execution request for the device search application may be issued by direct user input through an input unit functionally connected to the secondary electronic device.

Such a request related with the primary electronic device may be automatically issued on the basis of at least one of the movement distance of the secondary electronic device (e.g., the total distance moved by the secondary electronic device up to the location at which the execution request for the device search application is issued with respect to the location of the primary electronic device), a designated time (e.g., the time elapsed from acquisition of the location information of the primary electronic device), or the amount of path information accumulated according to movement of the secondary electronic device.

For example, when the total movement distance of the secondary electronic device with respect to the location information of the primary electronic device reaches a given range (e.g., about 1 km), the provisioning module 450 may automatically initiate the device search application. When the time elapsed from acquisition of the location information reaches the designated time (e.g., 30 minutes), the provisioning module 450 may automatically initiate the device search application. When the amount of path information accumulated according to movement of the secondary electronic device reaches a given range (e.g., about 10 Kbytes), the provisioning module 450 may automatically initiate the device search application.

In one embodiment, the provisioning module 450 may provide the guide information in the form of visual information through a display (e.g., display 350) or audio information through a speaker. Accordingly, the user wearing, holding or embedding the secondary electronic device may be aware of such guide information and move to the location of the primary electronic device (e.g., primary region) without difficulty. In various embodiments, "designated range", "preset range" or "given range" may be defined or adjusted by the user or designer according to the context.

The transfer module 470 may send the path information to an external device, which may then display map information corresponding to the path information. Here, the map information may correspond to the path of movement of the secondary electronic device drawn on a map with respect to the primary region of the primary electronic device by use of the path information. The external device may be an electronic device capable of executing a map application other than the primary electronic device having provided the location information.

Figure 5A:
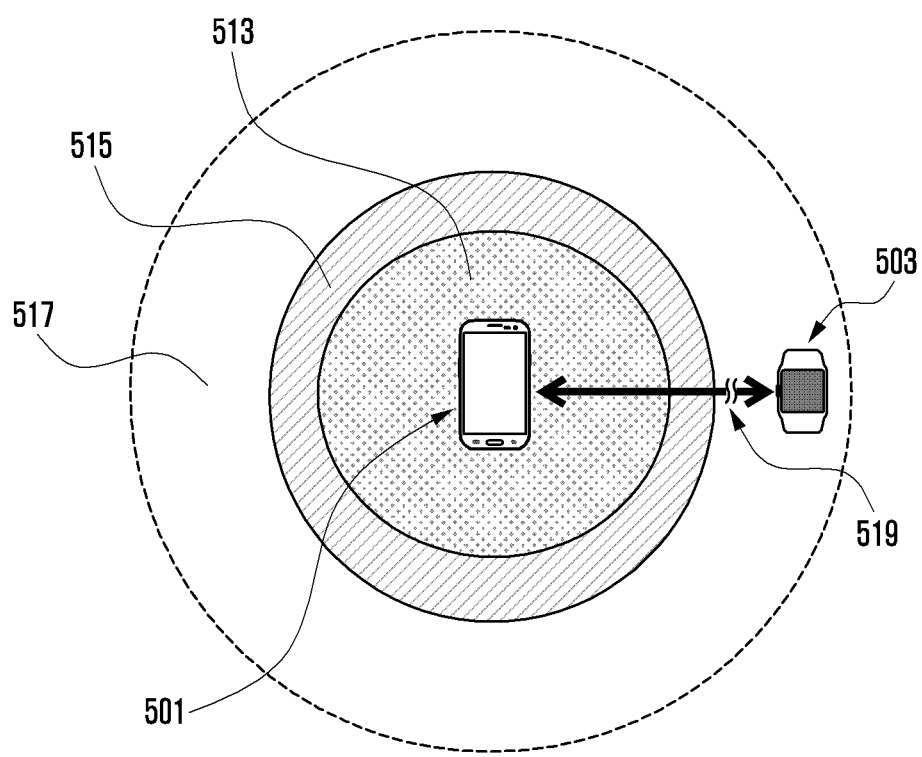
FIG. 5A and FIG. 5B illustrate signal strengths for communication between the primary electronic device and the secondary electronic device according to various embodiments of the present disclosure.

FIG. 5A illustrates signal strengths for communication between a primary electronic device (e.g., primary electronic device 201) and a secondary electronic device (e.g., secondary electronic device 203) according to various embodiments.

Referring to FIG. 5A, the signal strength for communication (e.g., short-range D2D communication) between the secondary electronic device 503 and the primary electronic device 501 may vary according to the distance between the secondary electronic device 503 and the primary electronic device 501. According to the variation of the signal strength with movement of the user wearing, holding or embedding the secondary electronic device 503, the area between the primary electronic device 501 and the secondary electronic device 503 may be divided into a first area 513, a second area 515 and a third area 517. The signal strength may be high (or strong) in the first area 513. The signal strength may be medium (or weak) in the second area 515. The signal strength may be low (or undetected) in the third area 517. For example, in the third area 517, one of the primary electronic device 501 and the secondary electronic device 503 may be unable to sense a signal from the other device thereof (with the undetected state being indicated by element 519).

Figure 5B:
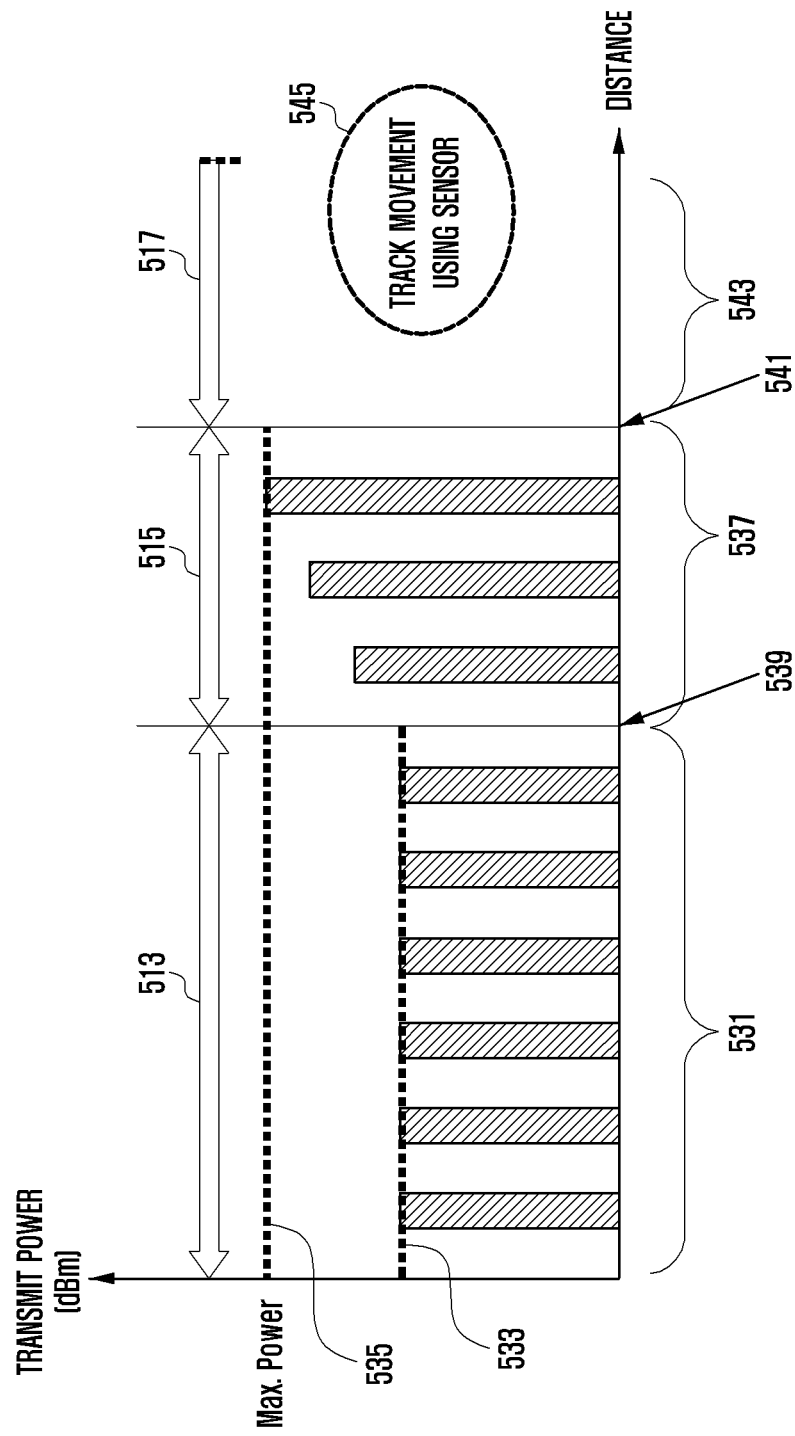

FIG. 5B illustrates signal strengths for communication between a primary electronic device (e.g., primary electronic device 201) and a secondary electronic device (e.g., secondary electronic device 203) according to various embodiments. In FIGS. 2A and 2B, the same or similar reference symbols are used to refer to the same or like elements.

Referring to FIG. 5B, the first area 513 may correspond to a first designated range 531 in which the distance between the secondary electronic device 503 and the primary electronic device 501 (i.e., the first distance) is, for example, less than about, for example, 10 m. When the first distance is within the first designated range 531, one of the primary electronic device 501 and the secondary electronic device 503 is able to successfully receive a signal from the other thereof.

Within the first designated range 531, the secondary electronic device 503 may receive an acknowledgement (ACK) indicating successful signal reception from the primary electronic device 501. Hence, the secondary electronic device 503 may send a signal (e.g., packet data) at preset transmit power 533 (e.g., default transmit power) to the primary electronic device 501. The preset transmit power 533 may be less than the maximum transmit power 535 of the secondary electronic device 503.

The second area 515 may correspond to a second designated range 537 in which the distance between the secondary electronic device 503 and the primary electronic device 501 (second distance) is, for example, greater than or equal to about, for example, 10 m and less than 15 m. When the second distance is within the second designated range 537, the strength of a signal received by the secondary electronic device 503 from the primary electronic device 501 may decrease as the secondary electronic device 503 becomes more distant from the primary electronic device 501.

For example, as the secondary electronic device 503 is moved from a first threshold position 539 to a second threshold position 541, the strength of a signal received by the secondary electronic device 503 from the primary electronic device 501 may decrease. With the increasing second distance, the secondary electronic device 503 may increase the transmission power beyond the preset transmission power 533. The secondary electronic device 503 may increase the transmit power up to the maximum transmit power 535 in consideration of the amount of battery consumption. In one embodiment, when the secondary electronic device 503 reaches the first threshold position 539, it may receive an ACK indicating low signal strength from the primary electronic device 501.

The third area 517 may correspond to a third designated range 543 in which the distance between the secondary electronic device 503 and the primary electronic device 501 (third distance) is, for example, greater than or equal to about 15 m. When the third distance is within the third designated range 543, one of the primary electronic device 501 and the secondary electronic device 503 are unable to receive a signal from the other thereof. That is, link loss may occur. When the secondary electronic device 503 reaches the second threshold position 541, it may be unable to receive an ACK from the primary electronic device 501. Here, the secondary electronic device 503 may discontinue sending a signal to the primary electronic device 501.

In one embodiment, when the secondary electronic device 503 is located in the second area 515, the secondary electronic device 503 (e.g., acquisition module 410) may receive location information of the primary electronic device 501. When located in the third area 517, the secondary electronic device 503 (e.g., determination module 430) may track motion or movement of the secondary electronic device 503 by use of a nine-axis sensor module composed of an accelerometer, gyroscope and magnetometer. In this case, the primary region related to the location of the primary electronic device 501 may correspond to the second threshold position 541. In order words, the distance between the primary region and the primary electronic device 501 may be the second distance.

In one embodiment, although not shown, when the secondary electronic device 503 receives location information of the primary electronic device 501, it may track movement of the secondary electronic device 503 in, for example, the second area 515. In this case, the primary region related to the location of the primary electronic device 501 may correspond to the first threshold position 539. In order words, the distance between the primary region and the primary electronic device 501 may be the first distance. In FIG. 5, division of the first to third areas 513 to 517 is an illustration for ease of description, and may be realized in various ways by the user or designer of the secondary electronic device 503. Division of transmit power levels of the secondary electronic device 503 is an illustration for ease of description. In various embodiments, the secondary electronic device 503 may receive location information of the primary electronic device 501 or perform movement tracking indicated by element 545 when the transmit power is set to a particular value.

Figure 6:
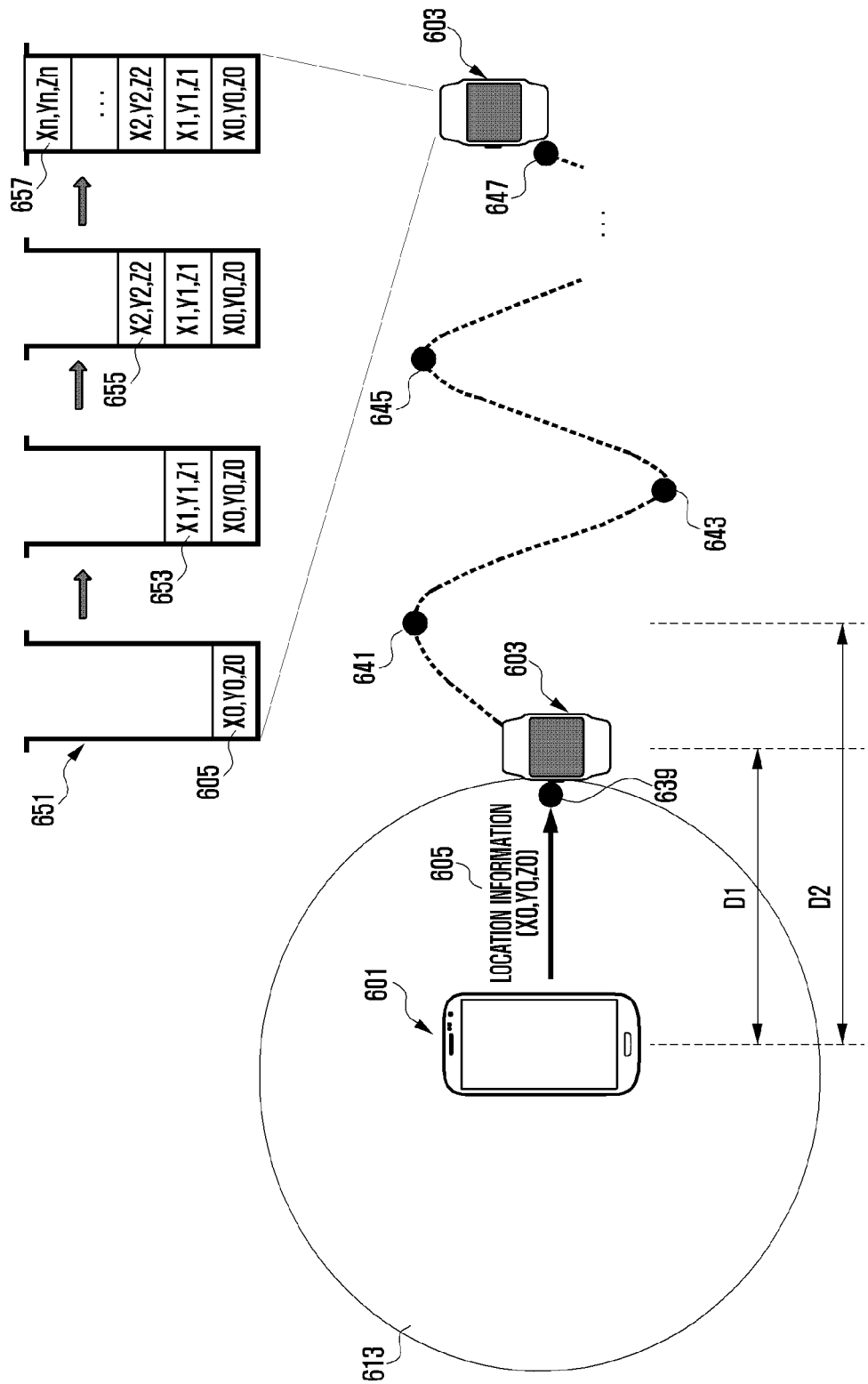
FIG. 6 illustrates acquisition of path information of the secondary electronic device according to various embodiments of the present disclosure.

FIG. 6 illustrates acquisition of path information of a secondary electronic device (e.g., secondary electronic device 503) according to various embodiments of the present disclosure. Referring to FIG. 6, the secondary electronic device 603 (e.g., determination module 430) may sequentially store path information corresponding to movement of the secondary electronic device 603 in a memory 651 (e.g., memory 330 of FIG. 3 implementing a stack). For example, the following description is based on an assumption that the signal strength for communication between the secondary electronic device 603 and the primary electronic device 601 may be high (or strong) in the first area 613. When the secondary electronic device 603 is placed at a first reference position 639 (e.g., first threshold position 539) separated by a first distance D1 from the primary electronic device 601, the secondary electronic device 603 (e.g., acquisition module 410) may receive location information 605 (X0, Y0, Z0) corresponding to the location of the primary electronic device 601 from the primary electronic device 601. The secondary electronic device 603 may store the location information 605 in the memory 651.

While the secondary electronic device 603 is moved to a second reference position 641 (e.g., second threshold position 541) separated by a second distance D2 from the primary electronic device 601, the secondary electronic device 603 (e.g., determination module 430) may receive location information 605 of the primary electronic device 601 on a periodic basis. When the location of the primary electronic device 601 changes, the secondary electronic device 603 may newly receive changed location information from the primary electronic device 601. For example, the location information 605 (X0, Y0, Z0) may include information regarding the latitude, longitude and altitude of the primary electronic device 601. Various types of location information for the primary electronic device 601 may be represented as (X0, Y0, Z0) and changed by the user or designer of the secondary electronic device 603 (or the primary electronic device 601).

When the secondary electronic device 603 is located at the second reference position 641 (e.g., second threshold position 541), the secondary electronic device 603 (e.g., determination module 430) may sequentially store path information corresponding to movement of the secondary electronic device 603 in the memory 651 (from the point in time of being located at the second reference position 641). For example, when the secondary electronic device 603 is moved from the second reference position 641 in a specific direction to a first movement position 643, the secondary electronic device 603 may obtain path information 653 (X1, Y1, Z1) corresponding to the first movement position 643 with respect to the location information 605 and store the path information 653 in the memory 651. For example, the path information 653 may include information regarding the movement direction, movement distance or altitude change during movement from the second reference position 641 to the first movement position 643.

When the secondary electronic device 603 is moved from the first movement position 643 to a second movement position 645, the secondary electronic device 603 may obtain path information 655 (X2, Y2, Z2) corresponding to the second movement position 645 with respect to the location information 653 corresponding to the first movement position 643 and store the path information 655 in the memory 651 as the next entry of the path information 653. In general, when the secondary electronic device 603 is located at an $N^{th}$ movement position 647 (N>2, natural number) as a result of movement of the primary electronic device 601, the secondary electronic device 603 may obtain path information 657 (Xn, Yn, Zn) corresponding to the $N^{th}$ movement position with respect to path information corresponding to the $N-1^{th}$ movement position.

The secondary electronic device 603 may store the path information 657 in the memory 651 as the next entry of the path information corresponding to the $N-1^{th}$ movement position. While being moved, the secondary electronic device 603 may repeatedly store path information corresponding to location changes due to movement of the secondary electronic device 603 in the memory 651. Hence, it is possible for the secondary electronic device 603 to provide guide information that enables the user wearing the secondary electronic device 603 to return to the previous position.

In FIG. 6, the secondary electronic device 603 is described as obtaining path information from the point in time of being located at the second reference position 641. However, the point in time at which the secondary electronic device 603 may obtain path information is not limited to the second reference position 641. For example, the secondary electronic device 603 may start to obtain path information at the first reference position 639. In other words, when the location information 605 has been received from the primary electronic device 601, the secondary electronic device 603 may obtain path information in accordance with movement of the primary electronic device 601 at any time.

In one embodiment, when the primary electronic device 601 is capable of generating sound, vibration or screen blinking, the secondary electronic device 603 may obtain location information of the primary electronic device 601 in a specific region where the primary electronic device 601 is recognizable. Thereafter, the secondary electronic device 603 may obtain path information corresponding to movement of the secondary electronic device 603 with respect to the specific region. The primary region may correspond to a position at which acquisition of the path information of the secondary electronic device 603 is initiated. For example, when the path information of the secondary electronic device 603 is obtained at the first reference position 639, the primary region may correspond to the first reference position 639. On the other hand, when the path information of the secondary electronic device 603 is obtained at the second reference position 641, the primary region may correspond to the second reference position 641.

In one embodiment, the secondary electronic device 603 may obtain its path information autonomously regardless of location information of the primary electronic device 601 or the distance to the primary electronic device 601. That is, the secondary electronic device 603 may identify path information corresponding to movement thereof without obtaining the location information 605 of the primary electronic device 601.

Figure 7:
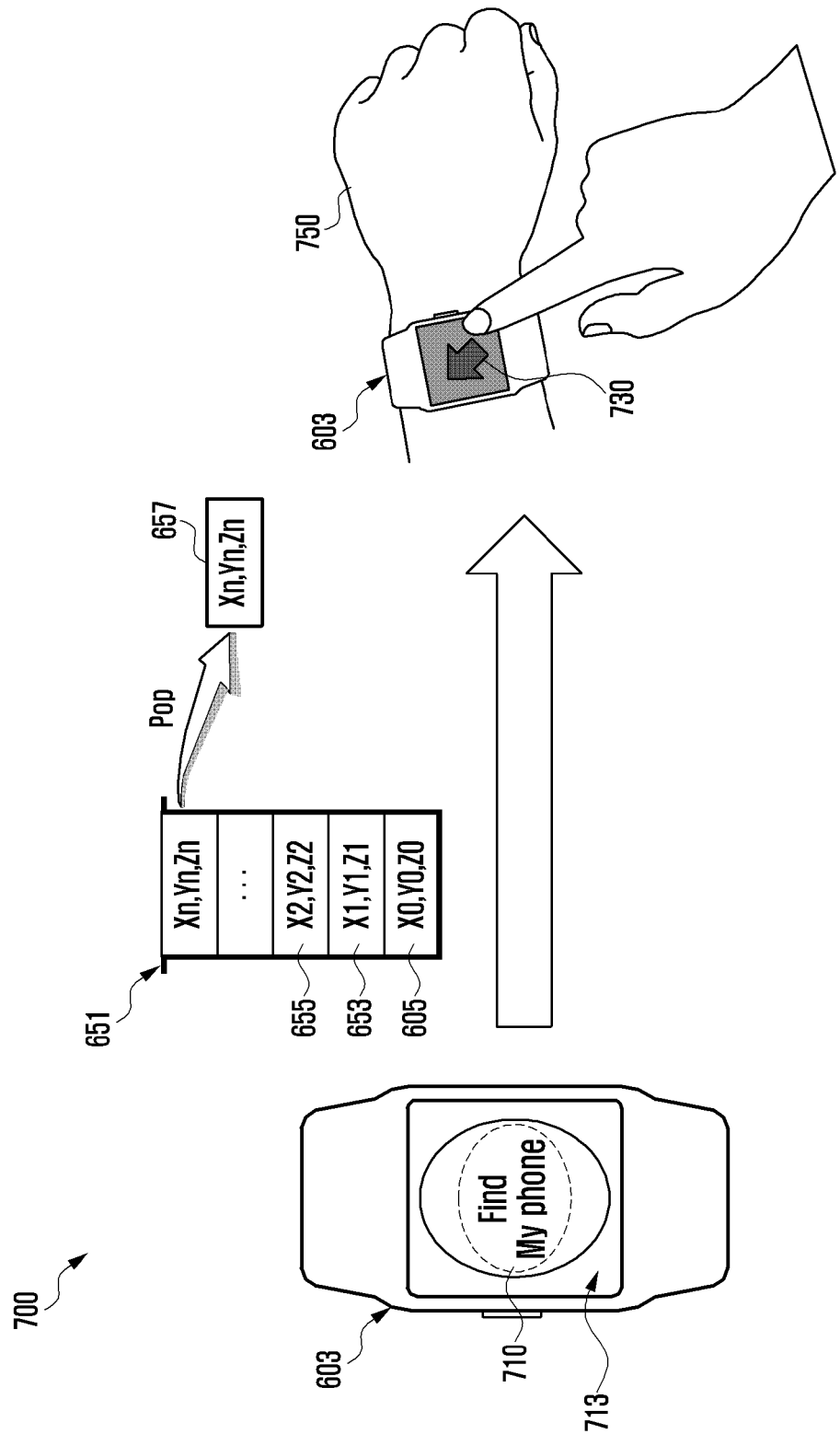
FIG. 7 illustrates provisioning of guide information by the secondary electronic device using path information according to various embodiments of the present disclosure.

FIG. 7 illustrates provisioning of guide information by a secondary electronic device (e.g., secondary electronic device 603) using path information according to various embodiments of the present disclosure. In FIGS. 6 and 7, the same or similar reference symbols are used to refer to the same or like elements and a repeated description thereof is omitted. In one embodiment, the secondary electronic device 603 (e.g., provisioning module 450) may provide the user 750 with guide information corresponding to the path information through at least one output means. For example, when an execution request for a device search application 710 is issued, the secondary electronic device 603 may retrieve pieces or portions of path information 653, 655 and 657 (e.g., first, second, third, etc. path information) that have been sequentially stored in the memory 651 in accordance with movement of the secondary electronic device 603 and produce guide information corresponding to the path information. Here, the secondary electronic device 603 may retrieve pieces of path information 653, 655 and 657 in sequence from the memory 651 in reverse of the order in which the pieces of path information 653, 655 and 657 have been obtained.

For example, the secondary electronic device 603 may retrieve path information 657 (Xn, Yn, Zn) corresponding to the $N^{th}$ movement position (e.g., $N^{th}$ movement position 647) from the memory 651 first, and display first guide information corresponding to the path information 657 as UI information (e.g., direction indicator) 730 on the display 713. Here, the first guide information may include information regarding the direction, distance, or altitude change of movement from the $N^{th}$ movement position to the $N-1^{th}$ movement position. That is, the movement direction indicated by the first guide information may be the opposite of the movement direction indicated by the path information 657.

After repetition of similar processes, the secondary electronic device 603 may retrieve path information 655 (X2, Y2, Z2) corresponding to the second movement position (e.g., second movement position 645) from the memory 651, and display second guide information corresponding to the path information 655 on the display 713. Here, the second guide information may include information regarding the direction, distance, or altitude change of movement from the second movement position to the first movement position (e.g., first movement position 643).

The secondary electronic device 603 may retrieve path information 653 (X1, Y1, Z1) corresponding to the first movement position (e.g., first movement position 643) from the memory 651, and display third guide information corresponding to the path information 653 on the display 713. Here, the third guide information may include information regarding the direction, distance, or altitude change of movement from the first movement position to the reference position for initiating acquisition of the path information (e.g., second reference position 641).

The secondary electronic device 603 (e.g., provisioning module 450) may retrieve pieces of path information in sequence from the memory 651 in reverse of the order in which the pieces of path information have been obtained according to movement of the secondary electronic device 603. The secondary electronic device 603 may provide guide information to the user 750 by use of the pieces of path information 653, 655 and 657 retrieved from the memory 651. Consequently, the guide information helps the user 750 move from the current location to a region where the primary electronic device 601 is recognizable (e.g., primary region).

Figure 8:
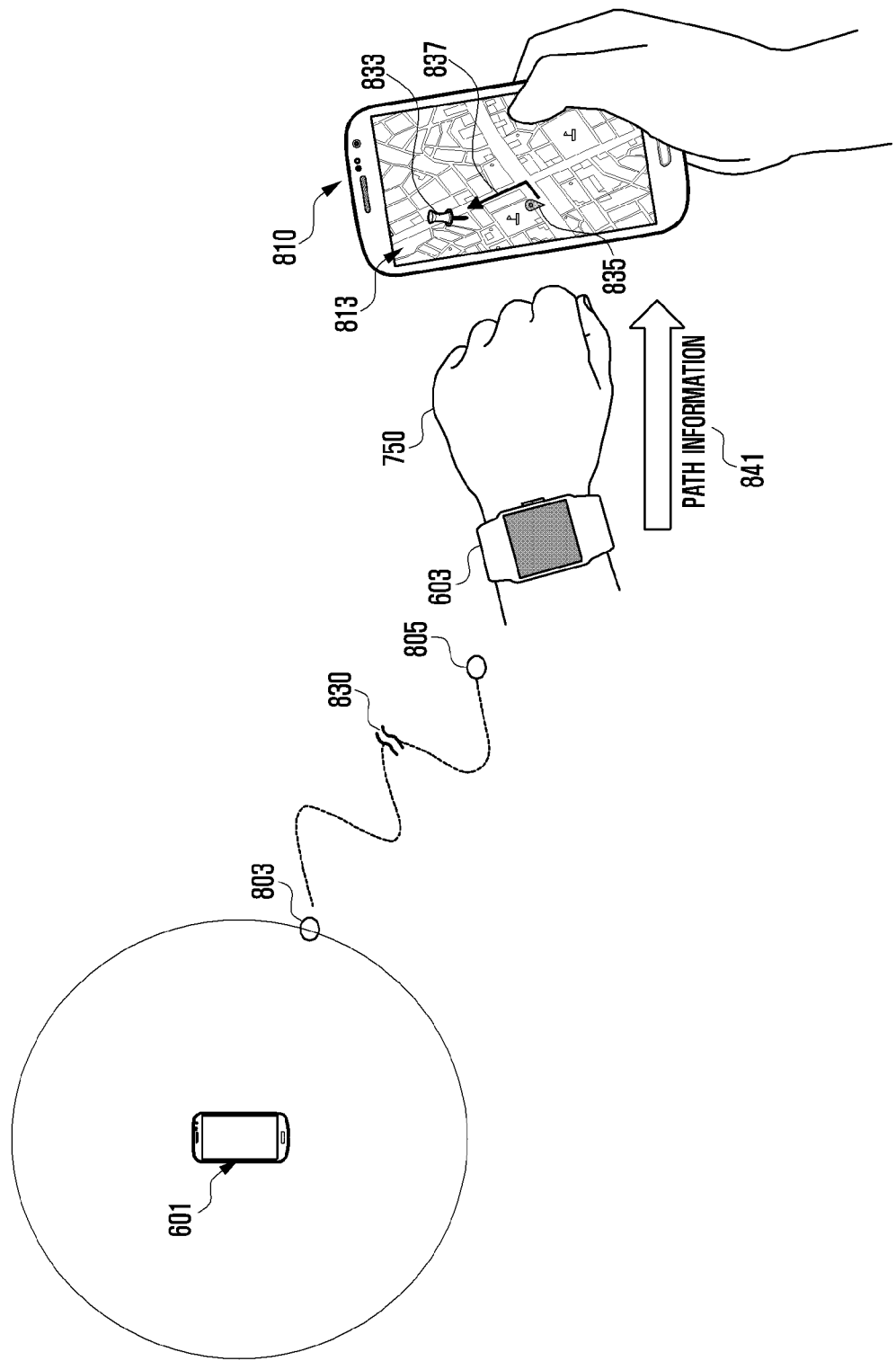
FIG. 8 illustrates provisioning of guide information by the secondary electronic device using path information according to various embodiments of the present disclosure.

FIG. 8 illustrates provisioning of guide information by a secondary electronic device (e.g., secondary electronic device 603) using path information according to various embodiments of the present disclosure. In one embodiment, the secondary electronic device 603 (e.g., transfer module 470) may provide guide information corresponding to the path information through an external device 810 other than the primary electronic device 601. For example, the secondary electronic device 603 may be moved from a first region 803 (e.g., first reference position 639 or second reference position 641) to a second region 805 where the communication (e.g., D2D communication) with the primary electronic device 601 is broken as indicated by element 830. Here, the first region 803 may be a region in which the user 750 wearing the secondary electronic device 603 is aware of the primary electronic device 601 via a notification as sound or vibration generated by the primary electronic device 601. The second region 803 may be a region in which a search request for the primary electronic device 601 is issued.

The secondary electronic device 603 may send path information 841 (e.g., path information stored in the memory 651), which is obtained in accordance with movement of the secondary electronic device 603, to the external device 810 so that the path information 841 is output via a map application 813 running on the external device 810. The map application 813 may output, on a map, a first mark 833 corresponding to the first region 803, a second mark 835 corresponding to the second region 805, and a third mark 837 corresponding to the movement path from the second region 805 to the first region 803.

According to various embodiments, an electronic device capable of providing location information may include a communication module to communicate with an external device, and a path providing module functionally connected with the communication module, wherein, when the electronic device is moved from a first position to a second position, the path providing module may identify path information corresponding to location changes due to movement and provide guide information corresponding to a path from the second position to the first position by use of the path information.

The path information may include first path information and second path information. The path providing module may output, as the guide information, first guide information corresponding to the first path information and second guide information corresponding to the second path information in reverse of the order in which the first path information and second path information have been obtained.

The path information may include information on at least one of the movement direction or the movement distance.

The path information may be automatically obtained when the signal strength for communication with the external device is within a designated range.

When the signal strength for communication with the external device is within the designated range, the path providing module may receive location information corresponding to the location of the external device.

The path information may include first path information and second path information; the first path information may be relative location information determined according to a first segment of the movement with respect to the location information; and the second path information may be relative location information determined according to a second segment of the movement with respect to the first path information.

The location information may be updated according to movement of the external device.

The location information may include at least one of latitude information, longitude information or site information corresponding to the location.

The path providing module may send the path information to the external device so that map information corresponding to the path information is displayed through the external device.

The path providing module may output information indicating the opposite of the movement direction as a portion of the guide information.

The path providing module may obtain location information corresponding to the location of the external device in communication with the electronic device before identifying the path information.

The path information may include relative location information determined in consideration of the movement with respect to the location information.

The location information may be automatically received from the external device when the signal strength for the communication is within a designated range.

Figure 9:
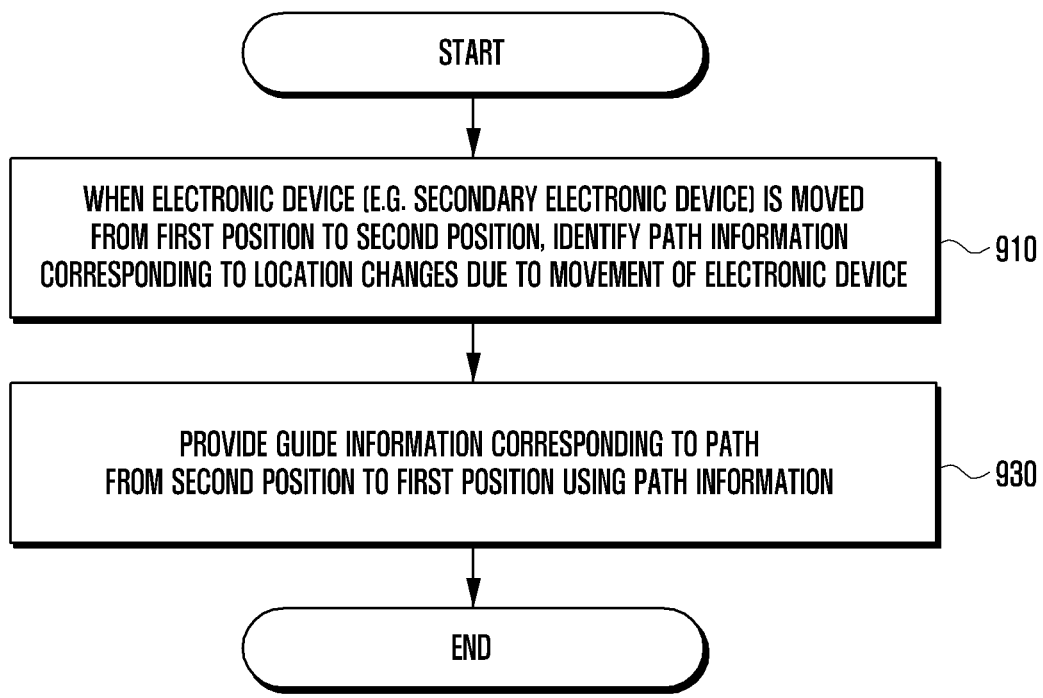
FIG. 9 is a flowchart illustrating an example procedure for the secondary electronic device to provide guide information according to various embodiments of the present disclosure.

FIG. 9 is a flowchart illustrating an example procedure for a secondary electronic device to provide guide information according to various embodiments of the present disclosure. At operation 910, when the secondary electronic device is moved from a first position to a second position, the secondary electronic device (e.g., determination module 430) identifies or detects path information corresponding to location changes thereof due to the movement. The path information may include information on the movement direction, movement distance and altitude changes during movement from the first position to the second position.

At operation 930, the secondary electronic device (e.g., provisioning module 450) provides guide information corresponding to a path from the second position to the first position. The secondary electronic device may provide the user with the guide information not only through an output unit of the secondary electronic device but also through an output unit of an external device. The guide information may include information indicating the opposite of the direction of movement from the first position to the second position.

Figure 10:
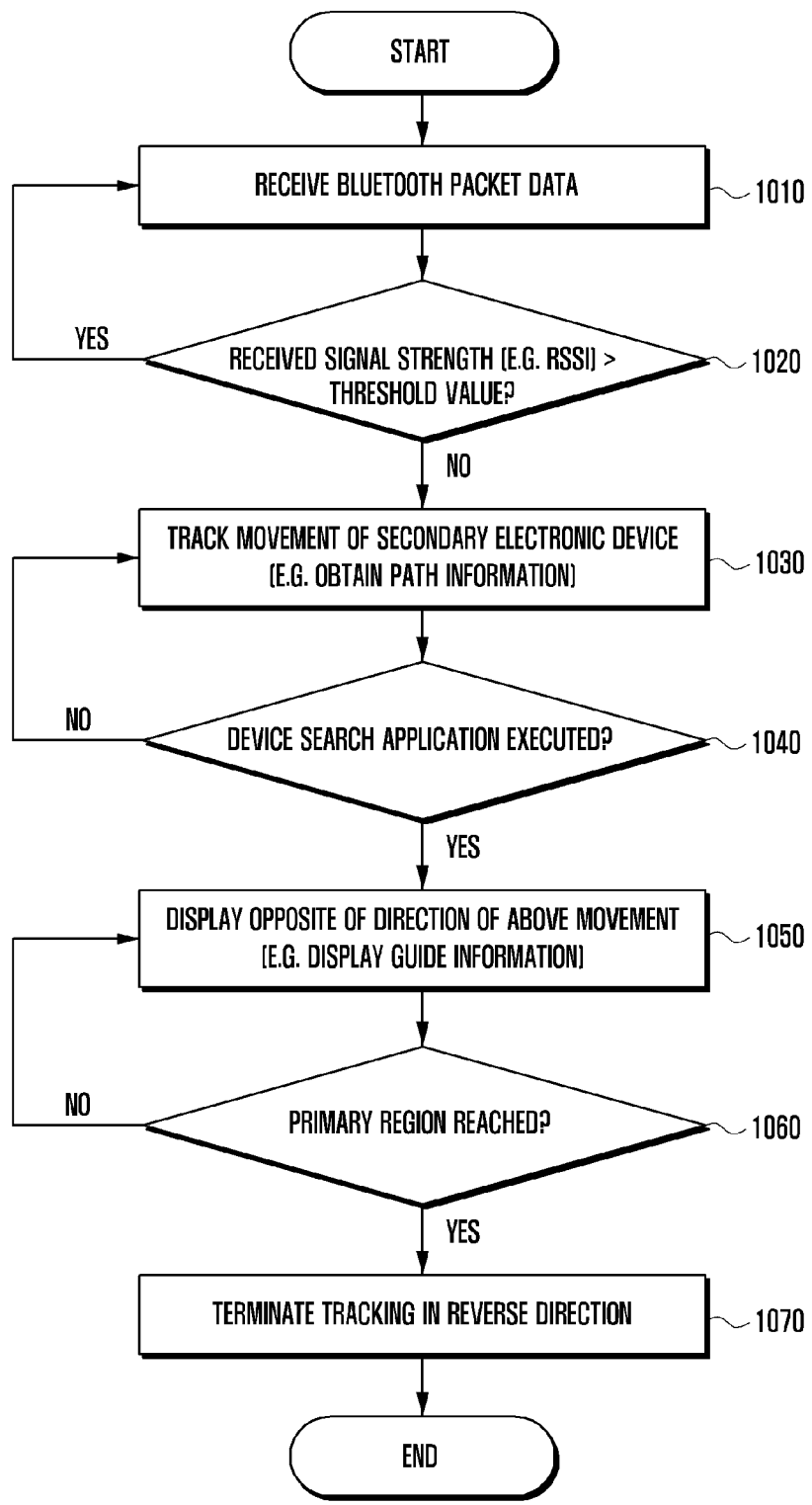
FIG. 10 is a flowchart illustrating an example procedure for the secondary electronic device to provide guide information according to various embodiments of the present disclosure.

FIG. 10 is a flowchart illustrating an example procedure for a secondary electronic device to provide guide information according to various embodiments of the present disclosure. At operation 1010, the secondary electronic device (e.g., secondary electronic device 203) receives packet data from the primary electronic device (e.g., primary electronic device 201) through Bluetooth communication (an example of D2D communication). At operation 1020, the secondary electronic device checks whether the signal strength (e.g., RSSI) of a signal from the primary electronic device is greater than a threshold value on the basis of the received packet data. When the signal strength is greater than the threshold value, the secondary electronic device may successfully receive packet data.

When the signal strength is less than or equal to the threshold value, at operation 1030, the secondary electronic device tracks movement of the secondary electronic device. For example, the secondary electronic device (e.g., determination module 430) may obtain path information corresponding to movement of the secondary electronic device by use of a nine-axis sensor module.

At operation 1040, the secondary electronic device checks whether a device search application is executed to search for the primary electronic device. When a device search application is not executed, the procedure proceeds returns to operation 1030 at which the secondary electronic device identifies path information by tracking its movement. When a device search application is executed, at operation 1050, the secondary electronic device (e.g., provisioning module 450) provides guide information in which path information is utilized but displayed in an opposite direction of movement of the secondary electronic device. The guide information may be displayed through an output unit.

At operation 1060, the secondary electronic device checks whether the primary region is reached. That is, a determination is made as to whether the secondary electronic device is disposed at or sufficiently near the primary region. Here, when the primary electronic device can generate sound, vibration, sweet fragrance or visual effect in response to execution of the device search application, the primary region (e.g., first reference position 639 or second reference position 641) may correspond to a region where the primary electronic device is recognizable to the user wearing the secondary electronic device. When the primary region is not reached, the procedure returns to operation 1050 and continues display of the opposite direction of movement. When the primary region is reached, the secondary electronic device stops display of the opposite direction of movement and terminate track in the reverse direction in operation 1070.

According to various embodiments, a method for operating an electronic device to provide location information may include: identifying, when the electronic device is moved from a first position to a second position, path information corresponding to location changes due to movement of the electronic device; and providing guide information corresponding to a path from the second position to the first position by use of the path information.

The path information may include first path information and second path information. Providing guide information may include outputting, as the guide information, first guide information corresponding to the first path information and second guide information corresponding to the second path information in reverse of the order in which the first path information and second path information have been obtained.

Providing guide information may include outputting information indicating the opposite of the movement direction as a portion of the guide information.

The method may further include obtaining location information corresponding to the location of an external device in communication with the electronic device before identifying the path information.

The path information may include relative location information determined in consideration of the movement with respect to the location information.

The location information may be automatically received from the external device when the signal strength for the communication is within a designated range.

The path information may include information on at least one of the movement direction or the movement distance.

The path information may be automatically obtained when the signal strength for communication with the external device is within a designated range.

The method may further include receiving, when the signal strength for the communication is within the designated range, location information corresponding to the location of the external device from the external device.

The path information may include first path information and second path information; the first path information may be relative location information determined according to a first segment of the movement with respect to the location information; and the second path information may be relative location information determined according to a second segment of the movement with respect to the first path information.

The location information may be updated according to movement of the external device.

The location information may include at least one of latitude information, longitude information or site information corresponding to the location.

The method may further include sending the path information to the external device so that map information corresponding to the path information is displayed through the external device.

Figure 11:
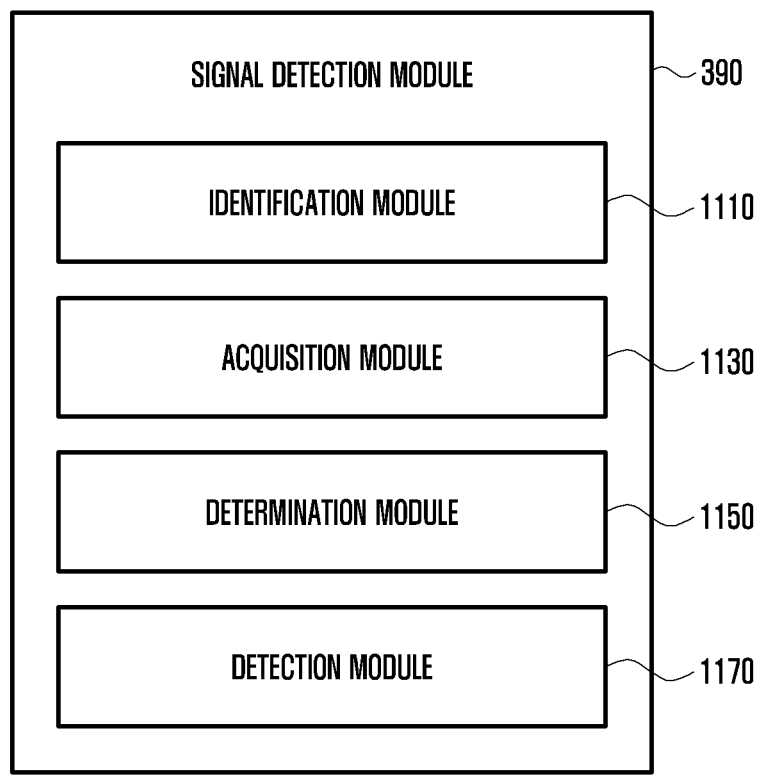
FIG. 11 is a block diagram of an example signal sensing module of an electronic device according to various embodiments of the present disclosure.

Next, additional information related to the signal detection module 390 is described in connection with FIGS. 11 to 13. A description of the information on the signal detection module 390 that is identical or similar to that on the path providing module 370 is omitted. FIG. 11 is a block diagram of an example signal sensing module of an electronic device (e.g., electronic device 301, referred to as "primary electronic device") according to various embodiments of the present disclosure.

In one embodiment, the signal detection module 390 may include an identification module 1110, an acquisition module 1130, a determination module 1150, and a detection module 1170.

The identification module 1110 may identify the location of the primary electronic device by use of one or more sensors functionally connected to the primary electronic device. The identification module 1110 may identify the location of the primary electronic device when the strength of a signal sent from an external device (e.g., electronic device 304, referred to as "secondary electronic device"), which supports communication (e.g., short-range D2D communication) with the primary electronic device, is within a designated range. For example, the identification module 1110 may automatically identify the location of the primary electronic device when the primary electronic device fails to detect a signal sent from the secondary electronic device (e.g., signal strength is low in a high/medium/low classification). When the signal strength is low, the identification module 1110 may determine that the secondary electronic device is lost or missing, and notify occurrence of a loss incident through the primary electronic device.

In one embodiment, the identification module 1110 may identify the location of the primary electronic device when the movement speed of the primary electronic device is within a designated range. For example, the movement speed may be classified into "high" (e.g., fast), "medium" (e.g., slow) and "low" (e.g., stationary or not moving). When the user holding the primary electronic device walks fast or runs or when the primary electronic device is placed in a moving vehicle, the movement speed of the primary electronic device may be high. When the user holding the primary electronic device walks at a foot's pace, the movement speed of the primary electronic device may be medium. When the primary electronic device is placed at a specific position or the user does not move, the movement speed of the primary electronic device may be low.

When the movement speed of the primary electronic device is high, the identification module 1110 may not identify the location of the primary electronic device. That is, although no signal from the secondary electronic device is detected, when the primary electronic device is moving fast, the identification module 1110 may skip location identification of the primary electronic device. When the movement speed of the primary electronic device is low, the identification module 1110 may identify the location of the primary electronic device. For example, when no signal from the secondary electronic device is detected and the primary electronic device is in a stationary state, the identification module 1110 may identify the location of the primary electronic device.

In one embodiment, the location of the primary electronic device may be represented on a coordinate basis, on a line basis, or on a geo-fence basis. For example, when a GPS fence is configured for a given geographical area, geo-fencing may be used to monitor whether the primary electronic device enters or leaves the GPS fence. The identification module 1110 may identify the location of the primary electronic device by use of a GPS module capable of receiving GPS information. The identification module 1110 may also identify the geographical location of the primary electronic device through Wi-Fi based triangulation using Wi-Fi communication. In addition to utilization of the GPS module and Wi-Fi module, the identification module 1110 may identify the location of the primary electronic device by use of various types of sensors.

The acquisition module 1130 may obtain log information related to the primary electronic device. For example, the acquisition module 1130 may record sites where the primary electronic device has visited and the number of visits to the sites. The acquisition module 1130 may assign priority to the sites according to the number of visits (e.g., a visit count). Here, one site with a large visit count may have a high priority than another site with a small visit count.

The acquisition module 1130 may examine the schedule of the user of the primary electronic device. For example, the acquisition module 1130 may examine schedule data stored by a scheduling application to identify specific sites with date and time values (e.g., year, month, day or hour). When the schedule data indicates, for example, a meeting with a date and time value of 2014-01-31-14 (year-month-day-hour) at building A, the acquisition module 1130 may obtain information indicating "2014-01-31-14" and "building A".

In one embodiment, on the basis of the schedule data, the acquisition module 1130 may predict a site where it is highly probable for the secondary electronic device to be placed at a particular time ("predicted site"). For example, based on an information element indicating "2014-01-31-14" and "building A", the acquisition module 1130 may examine occurrence of an event in the secondary electronic device (e.g., entering building A at a specific time) and determine the predicted site accordingly.

The determination module 1150 may adjust the scan cycle for detecting a signal from the secondary electronic device on the basis of the location of the primary electronic device. For example, the determination module 1150 may set the scan cycle to a first cycle at a first position and set the scan cycle to a second cycle at a second position. The determination module 1150 may adjust the scan cycle in consideration of at least one of visit counts for visit sites or schedule information. For example, the determination module 1150 may set the scan cycle to a small value for a first visit site with a large visit count (high priority), and set the scan cycle to a large value for a second visit site with a small visit count (low priority). That is, when the primary electronic device is placed at the first visit site, the scan cycle is set to a small value; and when the primary electronic device is placed at the second visit site, the scan cycle is set to a large value.

When the primary electronic device is placed at one predicted site as scheduled, the determination module 1150 may set the scan cycle to a first value. When the primary electronic device is not placed at a predicted site as scheduled, the determination module 1150 may set the scan cycle to a second value. Here, the first value may be smaller than the second value.

The detection module 1170 may detect a signal (e.g., scanning) sent from the secondary electronic device according to the scan cycle, which may vary depending upon the location of the primary electronic device. For example, when the primary electronic device is placed at a first visit site with a first priority, the detection module 1170 may detect a signal sent from the secondary electronic device according to a first scan cycle. When the primary electronic device is placed at a second visit site with a second priority, the detection module 1170 may detect a signal sent from the secondary electronic device according to a second scan cycle.

In one embodiment, when the primary electronic device is placed in a geo-fence at a scheduled time, the detection module 1170 may detect a signal sent from the secondary electronic device according to a first scan cycle. When the primary electronic device is not placed in a geo-fence at a scheduled time, the detection module 1170 may detect a signal sent from the secondary electronic device according to a second scan cycle longer than the first scan cycle. When the primary electronic device fails to detect a signal sent from the secondary electronic device, the detection module 1170 may adjust the scan cycle according to the location of the primary electronic device, reducing current consumption in the primary electronic device.

According to various embodiments, an electronic device capable of signal detection may include one or more sensors to identify the location of the electronic device, and a signal detection module configured to detect a signal sent from an external device according to a scan cycle varying in accordance with the location.

When the location is a first site, the signal detection module may perform signal scanning according to a first cycle; and when the location is a second site, the signal detection module may perform signal scanning according to a second cycle.

When the signal strength of a signal from the external device is within a given range or when the movement speed of the electronic device is within a designated range, the signal detection module may identify the location.

The scan cycle may be determined on the basis of at least one of visit counts for visit sites or user schedule information related to the electronic device in addition to the location.

The signal detection module may identify a predicted site for the external device on the basis of the schedule information, perform signal scanning according to a first cycle when the electronic device is placed at the predicted site, and perform signal scanning according to a second cycle when the electronic device is not placed at the predicted site.

Figure 12:
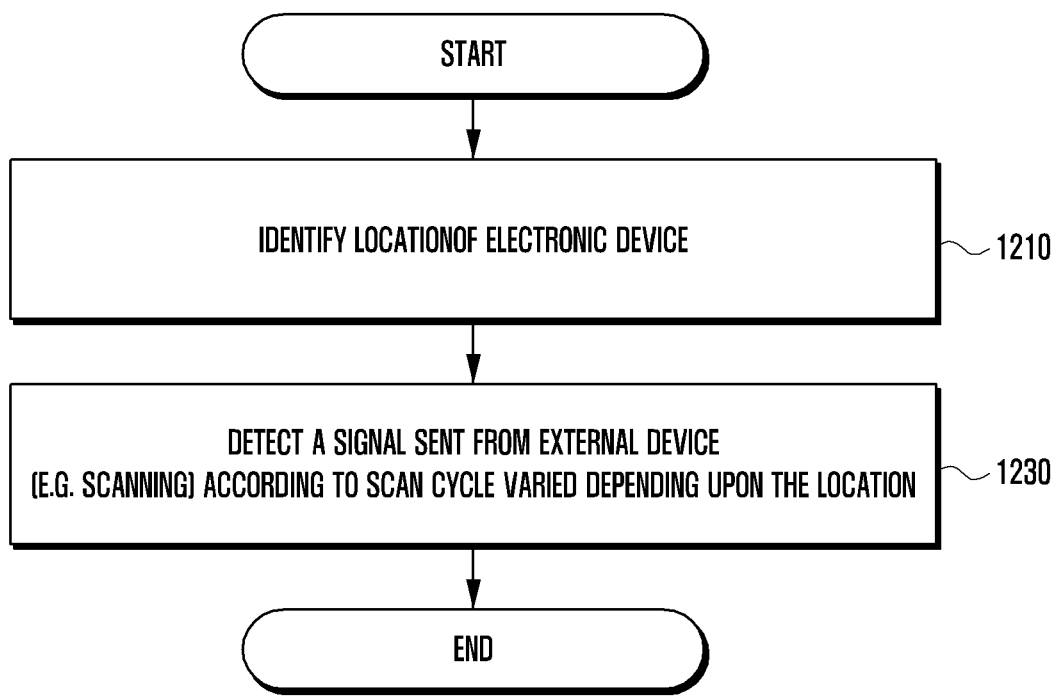
FIG. 12 is a flowchart illustrating an example procedure for the primary electronic device to detect a signal from the secondary electronic device according to various embodiments of the present disclosure.

FIG. 12 is a flowchart illustrating an example procedure for a primary electronic device to detect a signal sent from a secondary electronic device according to various embodiments of the present disclosure. At operation 1210, the primary electronic device (e.g., identification module 1110) identifies the location thereof (e.g., GPS information or geo-fencing information) using at least one sensor (e.g., GPS module or Wi-Fi module). At operation 1230, the primary electronic device (e.g., detection module 1170) detects a signal sent from a secondary electronic device capable of communicating with the primary electronic device according to a scan cycle varying depending upon the location. For example, when the primary electronic device is placed in an office room with a large visit count, it may perform signal scanning according to a scan cycle shorter than the default scan cycle. When the primary electronic device is placed in an amusement park with a very small visit count, it may perform signal scanning according to a scan cycle longer than the default scan cycle.

Figure 13:
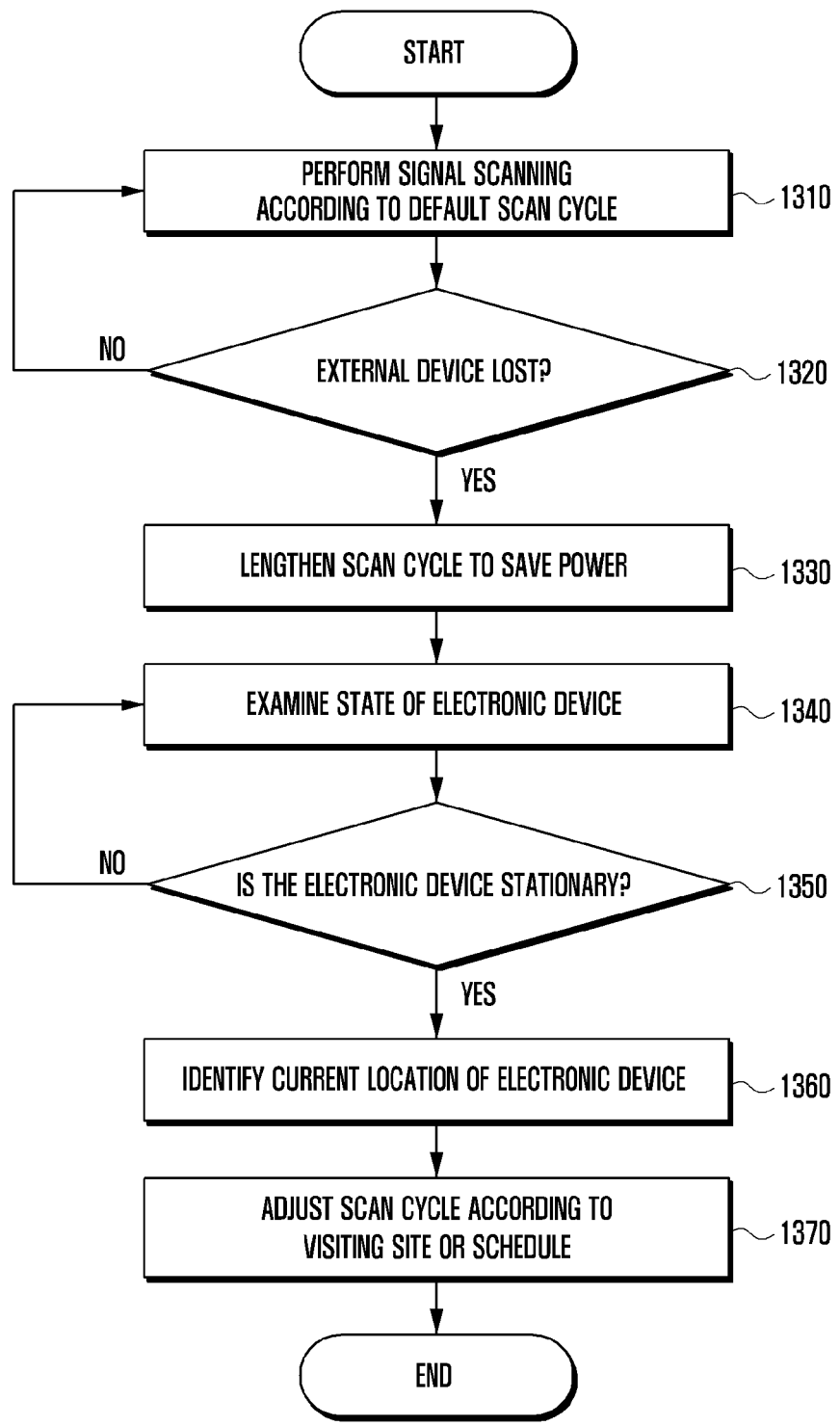
FIG. 13 is a flowchart illustrating an example procedure for the primary electronic device to detect a signal from the secondary electronic device according to various embodiments of the present disclosure.

FIG. 13 is a flowchart illustrating an example procedure for a primary electronic device to detect a signal from a secondary electronic device according to various embodiments. At operation 1310, when the communication between the primary electronic device and the secondary electronic device is stable (e.g., signal strength is high or medium), the primary electronic device performs signal scanning for a signal from the secondary electronic device according to a default scan cycle set by the user or designer of the primary electronic device. At operation 1320, the primary electronic device checks whether signal reception from the secondary electronic device is unsuccessful on the basis of the signal strength of a received signal (e.g., RSSI). For example, signal reception may fail when the secondary electronic device is lost.

If signal reception is successful, the procedure returns to operation 1310, at which the primary electronic device continues signal scanning based on the default scan cycle. If signal reception is unsuccessful (e.g., the secondary electronic device is lost), at operation 1330, the primary electronic device lengthens the scan cycle in order to reduce current consumption. Here, the new scan cycle may be longer than the default scan cycle.

At operation 1340, the primary electronic device examines or detects the state (e.g., movement) of the primary electronic device. For example, the primary electronic device may obtain information related to its movement or movement speed. At operation 1350, the primary electronic device checks whether the primary electronic device is in a stationary state on the basis of the state information. If the primary electronic device is in motion, the procedure returns to operation 1350, at which the primary electronic device continues state checking. If the primary electronic device is in a stationary state, at operation 1360, the primary electronic device identifies the current location of the primary electronic device.

At operation 1370, the primary electronic device adjusts the scan cycle on the basis of at least one of travel records or schedule information. For example, when the current location corresponds to a site with a large visit count, the primary electronic device may shorten the scan cycle for more frequent scanning. When the current location corresponds to a site with a small visit count, the primary electronic device may lengthen the scan cycle for less frequent scanning.

As another example, when the current location corresponds to a site with a date and time value recorded in the user schedule information, the primary electronic device may shorten the scan cycle for more frequent scanning. When the current location does not correspond to a site with a date and time value recorded in the user schedule information, the primary electronic device may lengthen the scan cycle for less frequent scanning. According to various embodiments, when the whereabouts of the secondary electronic device (e.g., accessary device) is not known to the primary electronic device (e.g., lost or missing accessary device), the primary electronic device may adjust the scan cycle to search for the secondary electronic device, so that current consumption can be reduced.

Figure 14:
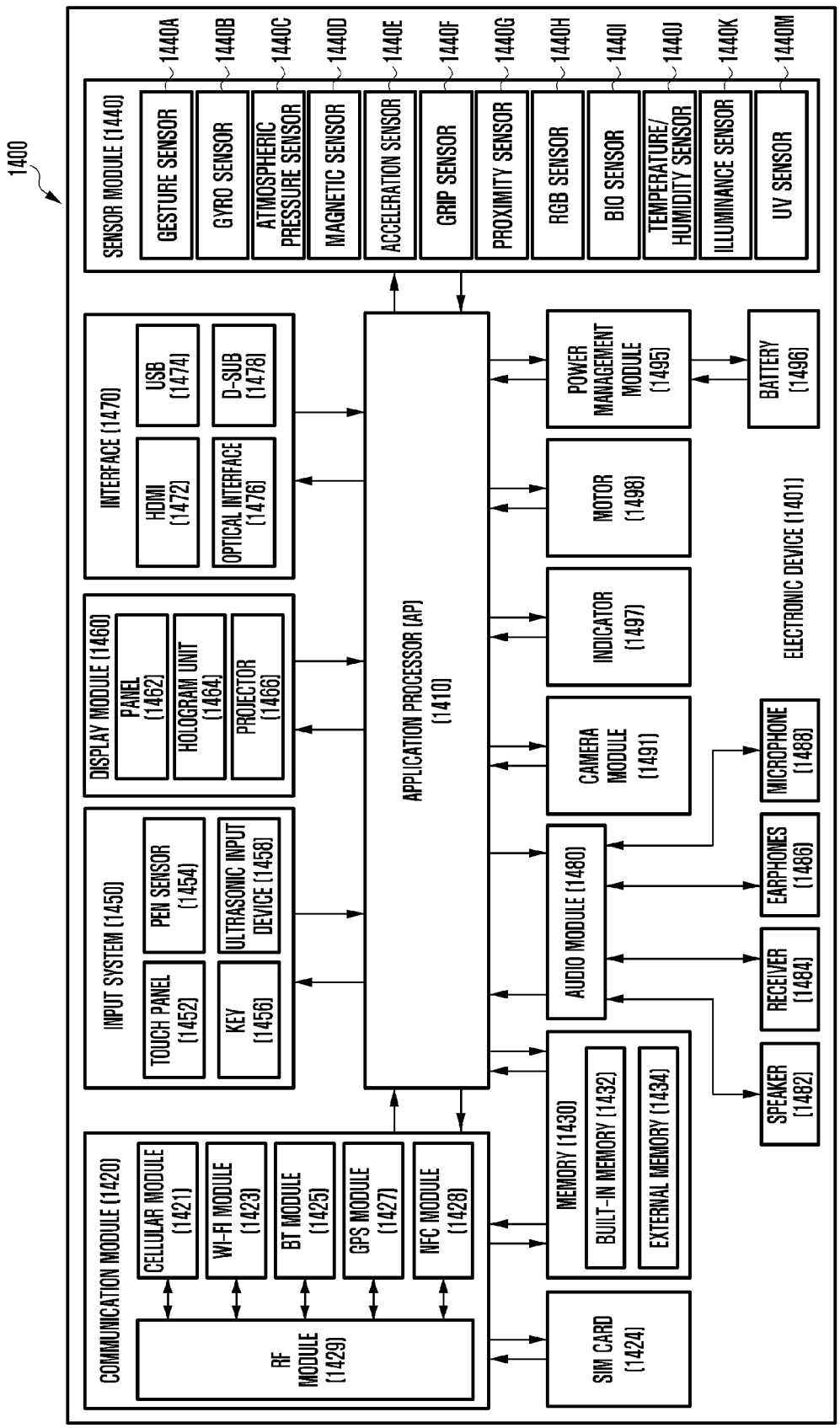
FIG. 14 is a block diagram illustrating an example electronic device according to various embodiments of the present disclosure.

FIG. 14 is a block diagram 1400 illustrating an example configuration of the electronic device 1401 according to various embodiments of the present disclosure. The electronic device 1401 may be of the whole or a part of the electronic device 301.

Referring to FIG. 14, the electronic device 1401 may include an Application Processor (AP) 1410, a communication module 1420, a Subscriber Identity Module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 may operate an Operating System (OS) and/or application programs to control a plurality of hardware and/or software components connected to the AP 1410 and perform data-processing and operations on multimedia data. For example, the AP 1410 may be implemented in the form of System on Chip (SoC). According to an embodiment, the AP 1410 may include a Graphic Processing Unit (GPU) (not shown).

The communication module 1420 (e.g., communication interface 360) may perform data communication with other electronic devices (e.g., electronic device 304 and server 306) through a network. According to an embodiment, the communication module 1420 may include a cellular module 1421, a Wi-Fi module 1423, a BT module 1425, a GPS module 1427, an NFC module 1428, and a Radio Frequency (RF) module 1429.

The cellular module 1421 is responsible for voice and video communication, text messaging, and Internet access services through a communication network (e.g., LTE, LTE-A, CDMA, WCDMA, UMTS, WiBro, and GSM networks). The cellular module 1421 may perform identification and authentication of electronic devices in the communication network using the SIM card 1424. According to an embodiment, the cellular module 1421 may perform at least one of the functions of the AP 1410. For example, the cellular module 1421 may perform at least a part of the multimedia control function.

According to an embodiment, the cellular module 1421 may include a Communication Processor (CP). The cellular module 1421 may be implemented in the form of SOC. Although the cellular module 1421 (e.g., communication processor), the memory 1430, and the power management module 1495 are depicted as independent components separated from the AP 1410, the present disclosure is not limited thereto but may be embodied in a way that the AP includes at least one of the components (e.g., cellular module 1421).

According to an embodiment, each of the AP 1410 and the cellular module 1421 (e.g., communication processor) may load a command or data received from at least one of the components on a non-volatile or volatile memory and process the command or data. The AP 1410 or the cellular module 1421 may store the data received from other components or generated by at least one of other components in the non-volatile memory.

Each of the Wi-Fi module 1423, the BT module 1425, the GPS module 1427, and the NFC module 1428 may include a processor for processing the data it transmits/receives. Although the cellular module 1421, the Wi-Fi module 1423, the BT module 1425, the GPS module 1427, and the NFC module 1428 are depicted as independent blocks; at least two of them (e.g., communication processor corresponding to the cellular module 1421 and Wi-Fi processor corresponding to the Wi-Fi module 1423) may be integrated in the form of SoC.

The RF module 1429 is responsible for data communication, e.g., transmitting/receiving RF signals. Although not depicted, the RF module 1429 may include a transceiver, a Power Amp Module (PAM), a frequency filter, and a Low Noise Amplifier (LNA). The RF module 1429 also may include the elements for transmitting/receiving electric wave in free space, e.g., conductor or conductive wire. Although FIG. 14 is directed to the case where the cellular module 1421, the Wi-Fi module 1423, the BT module 1425, the GPS module 1427, and the NFC module 1428 are sharing the RF module 1429, the present disclosure is not limited thereto but may be embodied in a way that at least one of the Wi-Fi module 1423, the BT module 1425, the GPS module 1427, or the NFC module 1428 transmits/receives RF signals an independent RF module.

The SIM card 1424 may be designed so as to be inserted into a slot formed at a predetermined position of the electronic device. The SIM card 1424 may store unique identity information (e.g., Integrated Circuit Card Identifier (IC-CID)) or subscriber information (e.g., International Mobile Subscriber Identity (IMSI)).

The memory 1430 (e.g., memory 330) may include at least one of the internal memory 1432 or an external memory 1434. The internal memory 1432 may include at least one of a volatile memory (e.g., Dynamic Random Access Memory (DRAM), Static RAM (SRAM), Synchronous Dynamic RAM (SDRAM) or a non-volatile memory (e.g., One Time Programmable Read Only Memory (OTPROM), Programmable ROM (PROM), Erasable and Programmable ROM (EPROM), Electrically Erasable and Programmable ROM (EEPROM), mask ROM, flash ROM, NAND flash memory, and NOR flash memory)

According to an embodiment, the internal memory 1432 may be a Solid State Drive (SSD). The external memory 1434 may be a flash drive such as Compact Flash (CF), Secure Digital (SD), micro-SD, Mini-SD, extreme Digital (xD), and Memory Stick. The external memory 1434 may be connected to the electronic device 1401 through various interfaces functionally. According to an embodiment, the electronic device 1401 may include a storage device (or storage medium) such as hard drive.

The sensor module 1440 may measure physical quantity or check the operation status of the electronic device 1401 and convert the measured or checked information to an electric signal. The sensor module 1440 may include at least one of gesture sensor 1440A, Gyro sensor 1440B, atmospheric pressure sensor 1440C, magnetic sensor 1440D, acceleration sensor 1440E, grip sensor 1440F, proximity sensor 1440G, color sensor 1440H (e.g., Red, Green, Blue "RGB" sensor), bio sensor 1440I, temperature/humidity sensor 1440J, illuminance sensor 1440K, and Ultra Violet (UV) sensor 1440M. Additionally or alternatively, the sensor module 1440 may include E-nose sensor (not shown), Electromyography (EMG) sensor (not shown), Electroencephalogram (EEG) sensor (not shown), Electrocardiogram (ECG) sensor (not shown), Infrared (IR) sensor (not shown), iris sensor (not shown), or fingerprint sensor (not shown). The sensor module 1440 may further include a control circuit for controlling at least one of the sensors included therein.

The input device 1450 may include a touch panel 1452, a (digital) pen sensor 1454, keys 1456, and an ultrasonic input device 1458. The touch panel 1452 may be one of capacitive, resistive, infrared, microwave type touch panel. The touch panel 1452 may include a control circuit. In the case of the capacitive type touch panel, it is possible to detect physical contact or approximation. The touch panel 1452 may further include a tactile layer. In this case, the touch panel 1452 may provide the user with haptic reaction.

The (digital) pen sensor 1454 may be implemented with a sheet with the same or similar way as touch input of the user or a separate recognition sheet. The keys 1456 may include physical buttons, optical key, and keypad. The ultrasonic input device 1458 is a device capable of checking data by detecting sound wave through a microphone 1488 and may be implemented for wireless recognition. According to an embodiment, the electronic device 1401 may receive the user input made by means of an external device (e.g., computer or server) connected through the communication module 1420.

The display 1460 (e.g., display 350) may include a panel 1462, a hologram device 1464, and a projector 1466. The panel 1462 may be a Liquid Crystal Display (LCD) panel or an Active Matrix Organic Light Emitting Diodes (AMOLED) panel. The panel 1362 may be implemented so as to be flexible, transparent, and/or wearable. The panel 1462 may be implemented as a module integrated with the touch panel 1452. The hologram device 1464 may present 3-dimensional image in the air using interference of light. The projector 1466 may project an image to a screen. The screen may be placed inside or outside the electronic device. According to an embodiment, the display 1460 may include a control circuit for controlling the panel 1462, the hologram device 1464, and the projector 1466.

The interface 1470 may include a High-Definition Multimedia Interface (HDMI) 1472, a Universal Serial Bus (USB) 1474, an optical interface 1476, and a D0subminiature (D-sub) 1478. The interface 1470 may include the communication interface 360 as shown in FIG. 3. Additionally or alternatively, the interface 1470 may include a Mobile High-definition Link (MHL) interface, a SD/MMC card interface, and infrared Data Association (irDA) standard interface.

The audio module 1480 may convert sound to electric signal and vice versa. At least a part of the audio module 1480 may be included in the input/output interface 340 as shown in FIG. 3. The audio module 1480 may process the audio information input or output through the speaker 1482, the receiver 1484, the earphone 1486, and the microphone 1488.

The camera module 1491 is a device capable of taking still and motion pictures and, according to an embodiment, includes at least one image sensor (e.g., front and rear sensors), a lens (not shown), and Image Signal Processor (ISP) (not shown), and a flash (e.g., LED or xenon lamp) (not shown).

The power management module 1495 may manage the power of the electronic device 1401. Although not shown, the power management module 1495 may include a Power Management Integrated Circuit (PMIC), a charger Integrated Circuit (IC), a battery, and a battery or fuel gauge.

The PMIC may be integrated into an integrated circuit or SoC semiconductor. The charging may be classified into wireless charging and wired charge. The charger IC may charge the battery and protect the charger against overvoltage or overcurrent. According to an embodiment, the charger IC may include at least one of wired charger or wireless charger ICs. Examples of the wireless charging technology includes resonance wireless charging and electromagnetic wave wireless charging, and there is a need of extra circuit for wireless charging such as coil loop, resonance circuit, and diode.

The battery gauge may measure the residual power of the battery 1496, charging voltage, current, and temperature. The battery 1496 may store or generate power and supply the stored or generated power to the electronic device 1401. The battery 1496 may include a rechargeable battery or a solar battery.

The indicator 1497 may display operation status of the electronic device 1401 or a part of the electronic device, booting status, messaging status, and charging status. The motor 1498 may converts the electronic signal to mechanical vibration. Although not shown, the electronic device 1401 may include a processing unit (e.g., GPU) for supporting mobile TV. The processing unit for supporting the mobile TV may be able to processing the media data abiding by the broadcast standards such Digital Multimedia Broadcasting (DMB), Digital Video Broadcasting (DVB), and media flow.

Each of the components of the electronic device according to various embodiments of the present disclosure may be implemented by one or more components and the name of the corresponding component may vary depending on a type of the electronic device. The electronic device according to various embodiments of the present disclosure may include at least one of the above described components, a few of the components may be omitted, or additional components may be further included. Also, some of the components of the electronic device according to various embodiments of the present disclosure may be combined to form a single entity, and thus may equivalently execute functions of the corresponding components before being combined.

FIG. 15 illustrates example communication protocols between electronic devices (e.g., electronic device 1510 and electronic device 1530) according to various embodiments of the present disclosure. Referring to FIG. 15, the communication protocols 1500 may include a device discovery protocol 1551, a capability exchange protocol 1553, a network protocol 1555, and an application protocol 1557.

The device discovery protocol 1551 is a protocol that can be used by an electronic device (e.g., electronic device 1510 or electronic device 1530) to discover a communicable external device and to establish a connection with the discovered external device. For example, the electronic device 1510 (e.g., electronic device 301) may use the device discovery protocol 1551 to find the electronic device 1530 (e.g., electronic device 304) as a device that permits communication with the electronic device 1510 through an available communication scheme (e.g., Wi-Fi, Bluetooth or USB). To establish a communication connection to the electronic device 1530, the electronic device 1510 may obtain identification information of the electronic device 1530 by use of the device discovery protocol 1551. Thereafter, the electronic device 1510 may use the identification information to establish a connection with the electronic device 1530.

In one embodiment, the device discovery protocol 1551 may be used to authenticate electronic devices. For example, the electronic device 1510 and the electronic device 1530 may authenticate each other on the basis of communication information such as Media Access Control (MAC) address, Universally Unique Identifier (UUID), Service Set Identifier (SSID) and IP address.

The capability exchange protocol 1553 may be a protocol that enables the electronic device 1510 and the electronic device 1530 to exchange information on available services or functions. For example, via the capability exchange protocol 1553, the electronic device 1510 may provide information on available services or functions thereof to the electronic device 1530, and vice versa. Here, an identifier indicating a particular service among available services may be exchanged between the electronic device 1510 and the electronic device 1530. That is, the electronic device 1510 may receive an identifier indicating a specific service among services provided by the electronic device 1530 from the electronic device 1530 via the capability exchange protocol 1553. Hence, the electronic device 1510 may determine whether the electronic device 1530 supports a specific service on the basis of the received service identifier.

The network protocol 1555 may be used to control data flows between the electronic devices (e.g., electronic device 1510 and electronic device 1530) connected for communication in order to provide coordinated services. For example, at least one of the electronic device 1510 or the electronic device 1530 may use the network protocol 1555 to control errors or quality of data. In addition, the network protocol 1555 may determine the transmission format of data exchanged between the electronic device 1510 and the electronic device 1530. At least one of the electronic device 1510 or the electronic device 1530 may use the network protocol 1555 to perform session management (e.g., session creation or termination) for data exchange.

The application protocol 1557 may be used to provide an external device with a service and service-related information. For example, the electronic device 1510 (e.g., electronic device 101) may use the application protocol 1557 to provide a service to the electronic device 1530 (e.g., electronic device 304 or server 306).

In one embodiment, the communication protocols 1500 may include a standard communication protocol, a proprietary communication protocol designed and implemented by an individual or organization (e.g., communication instrument manufacturer or network operator), or a combination thereof.

The term "module" according to the embodiments of the disclosure, means, but is not limited to, a unit of one of software, hardware, and firmware or any combination thereof. The term "module" may be used interchangeably with the terms "unit," "logic," "logical block," "component," or "circuit." The term "module" may denote a smallest unit of component or a part thereof. The term "module" may be the smallest unit of performing at least one function or a part thereof. A module may be implemented mechanically or electronically. For example, a module may include at least one of Application-Specific Integrated Circuit (ASIC) chip, Field-Programmable Gate Arrays (FPGAs), or Programmable-Logic Device known or to be developed for certain operations.

According to various embodiments of the present disclosure, the devices (e.g., modules or their functions) or methods may be implemented by computer program instructions stored in a computer-readable storage medium. In the case that the instructions are executed by at least one processor (e.g., processor 320), the at least one processor may execute the functions corresponding to the instructions. The computer-readable storage medium may be the memory 330. At least a part of the programming module may be implemented (e.g., executed) by the processor 320. At least a part of the programming module may include modules, programs, routines, sets of instructions, and processes for executing the at least one function.

The computer-readable storage medium includes magnetic media such as a floppy disk and a magnetic tape, optical media including a Compact Disc (CD) ROM and a Digital Video Disc (DVD) ROM, a magneto-optical media such as a floptical disk, and the hardware device designed for storing and executing program commands such as ROM, RAM, and flash memory. The programs commands include the language code executable by computers using the interpreter as well as the machine language codes created by a compiler. The aforementioned hardware device can be implemented with one or more software modules for executing the operations of the various example embodiments of the present disclosure.

In various embodiments, a module or programming module may include one or more components, an existing component thereof may be removed, or a new component may be added thereto. Operations supported by components of a module or programming module may be carried out in sequence, in parallel, by repetition, or by heuristics. One operation may be executed in a different order or be skipped, and a new operation may be added.

According to various embodiments, there is provided a storage medium storing instructions that implement a method for operating an electronic device to deliver location information, wherein the instructions are configured to cause, when the electronic device is moved from a first position to a second position, the electronic device to identify path information corresponding to location changes due to movement, and provide guide information corresponding to a path from the second position to the first position by use of the path information.

In addition, the instructions may also be configured to cause the electronic device to identify the location thereof and detect a signal sent from an external device according to a variable scan cycle determined based on the identified location.

In a feature of the present disclosure, it is possible for an electronic device to identify a path for movement leading to an external device on the basis of location information of the external device and output guide information toward the external device for the user. Hence, when the external device is lost or missing, the user may readily identify the location of the external device and find a path leading to the external device.

In addition, when the external device is lost or missing, the electronic device may adjust the search cycle for detecting a signal from the external device according to the location of the electronic device to thereby reduce current consumption.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

Hereinabove, embodiments of the present disclosure have been described with reference to the accompanying drawings. Specific terms or words used in the description should be construed in accordance with the present disclosure without limiting the subject matter thereof. It should be understood that many variations and modifications of the basic inventive concept described herein will still fall within the present disclosure as defined in the appended claims and their equivalents.

What is claimed is:

1. A method in an electronic device, comprising:
   in response to detecting a wireless signal strength of a location transmission to an external device is greater than a predetermined threshold, varying at least a power of the location transmission according to whether the wireless signal strength is greater than or less than a second predetermined threshold;
   in response to detecting that the wireless signal strength is lower than the predetermined threshold as the electronic device is moved from a first position to a second position, terminating the location transmission and detecting path information corresponding to a sequence of location changes according to movement of the electronic device from the first position to the second position; and controlling, by a processor, a display of the electronic device to display guide information including a generated path from the second position to the first position utilizing the detected path information.

2. The method of claim 1, wherein:

the predetermined threshold indicates comprises an inability to detect any signal from the external device, the detected path information further comprises first path information and second path information in the sequence of location changes, and wherein the guide information comprises first guide information corresponding to the first path information and second guide information corresponding to the second path information displayed in a reverse order relative to the sequence of location changes.

3. The method of claim 1, wherein the detected path information further comprises first path information and second path information in the sequence of location changes, and displaying the guide information further comprises reversing a direction of movement for each of the first path information and the second path information.

4. The method of claim 1, further comprising detecting a location of the external device in communication with the electronic device before detecting the path information, wherein:

when the wireless signal strength is greater than the second predetermined threshold, the power of the location transmission is set less than a maximum available power, and when the wireless signal strength is less than the second predetermined threshold, the power of the location transmission incrementally increases as the wireless signal strength decreases.

5. The method of claim 4, wherein the path information comprises relative location information that is based on movement of the electronic device relative to the detected location of the external device.

6. The method of claim 4, wherein the location of the external device is automatically received from the external device when a signal strength for communication with the external device is within a predetermined signal strength range.

7. An electronic device, comprising:

a display; and a processor configured to:

in response to detecting a wireless signal strength of a location transmission to an external device is greater than a predetermined threshold, varying at least a power of the location transmission according to whether the wireless signal strength is greater than or less than a second predetermined threshold, in response to detecting that the wireless signal strength is lower than the predetermined threshold as the electronic device is moved from a first position to a second position, terminate the location transmission and detect path information corresponding to a sequence of location changes according to movement of the electronic device from the first position to the second position, and control the display of the electronic device to display guide information including a generated path from the second position to the first position utilizing the detected path information.

8. The electronic device of claim 7, wherein:

the predetermined threshold indicates comprises an inability to detect any signal from the external device, the detected path information further comprises first path information and second path information in the sequence of location changes, and wherein the guide information comprises first guide information corresponding to the first path information and second guide information corresponding to the second path information displayed in reverse order relative to the sequence of location changes.

9. The electronic device of claim 7, wherein the path information comprises at least one of a movement direction and a movement distance of the electronic device.

10. The electronic device of claim 7, further comprising a communication module configured to communicate with the external device, wherein the path information is automatically detected when a signal strength of the communicate module communicating with the external device is within a predetermined signal strength range.

11. The electronic device of claim 7, further comprising a communication module configured to communicate with the external device, wherein the processor is further configured to:

when a signal strength of the communication module communicating with the external device is within a predetermined range, receive a location of the external device from the external device, wherein:

when the wireless signal strength is greater than the second predetermined threshold, the power of the location transmission is set less than a maximum available power, and when the wireless signal strength is less than the second predetermined threshold, the power of the location transmission incrementally increases as the wireless signal strength decreases.

12. The electronic device of claim 11, wherein the detected path information further comprises first path information and second path information in the sequence of location changes, and wherein the first path information comprises relative location information that is based on movement of the electronic device relative to the received location of the external device, and the second path information comprises relative location information that is based on a second segment of the movement of the electronic device relative to the first path information.

13. The electronic device of claim 11, wherein the received location of the external device is updated according to movement of the external device.

14. The electronic device of claim 11, wherein the received location of the external device is indicated by at least one of latitude information, longitude information and global-positioning information.

15. The electronic device of claim 7, further comprising a communication module configured to communicate with the external device, wherein the processor is further configured to transmit the path information to the external device utilizing the communication module for display through the external device.

* * * * *